Figure 16:
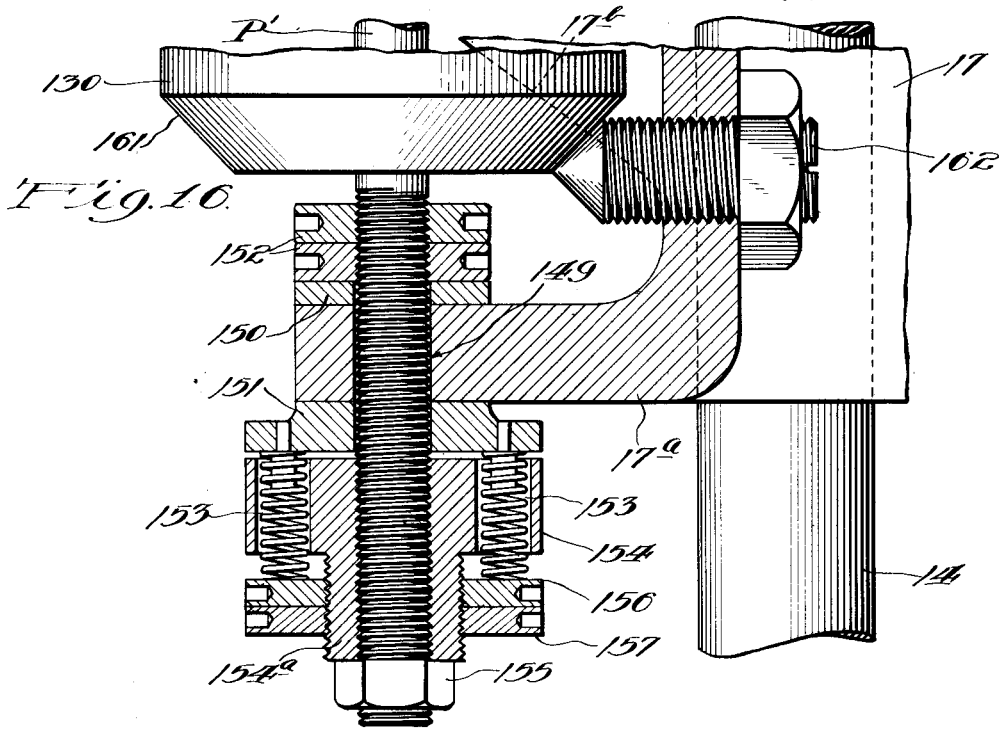

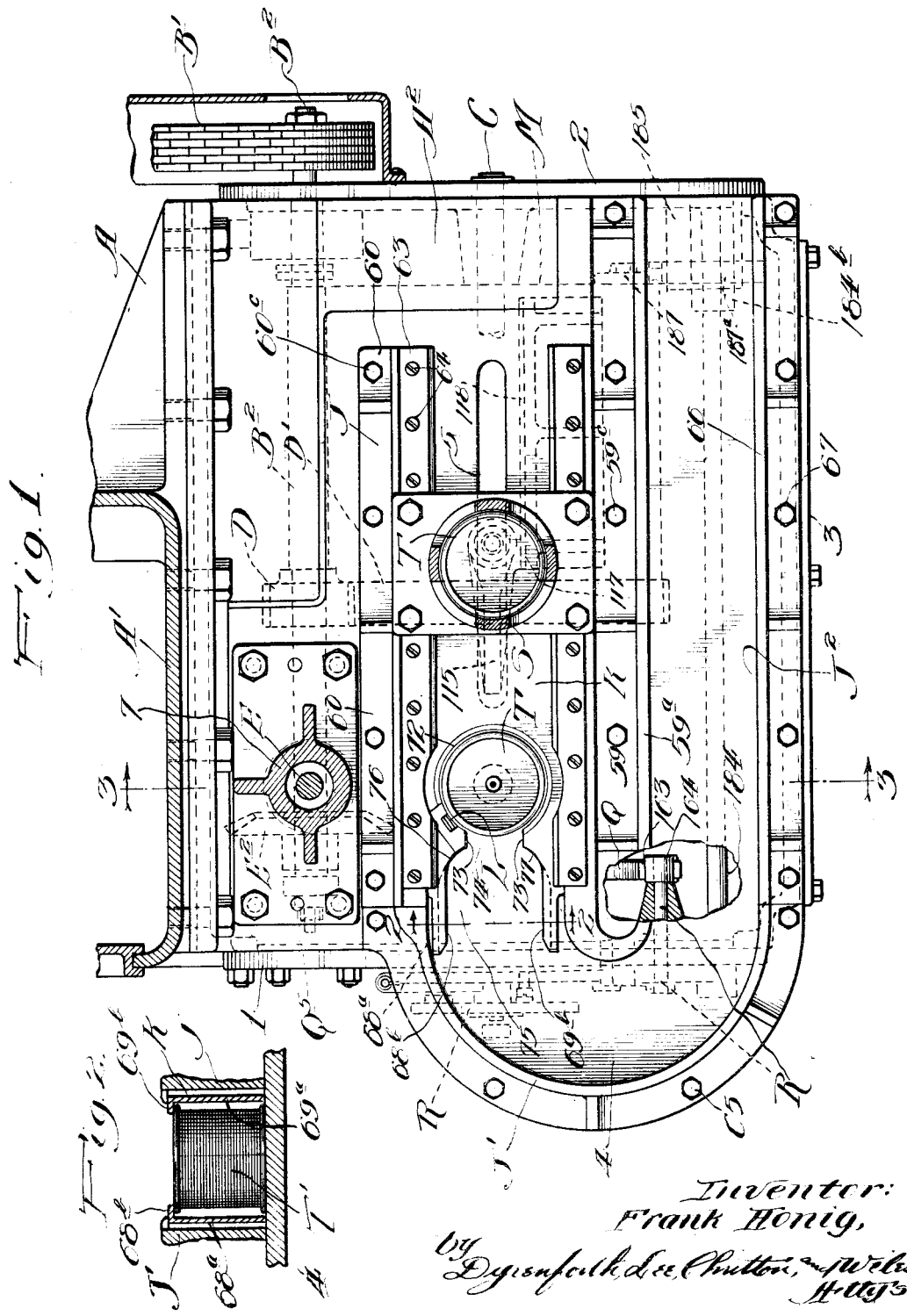

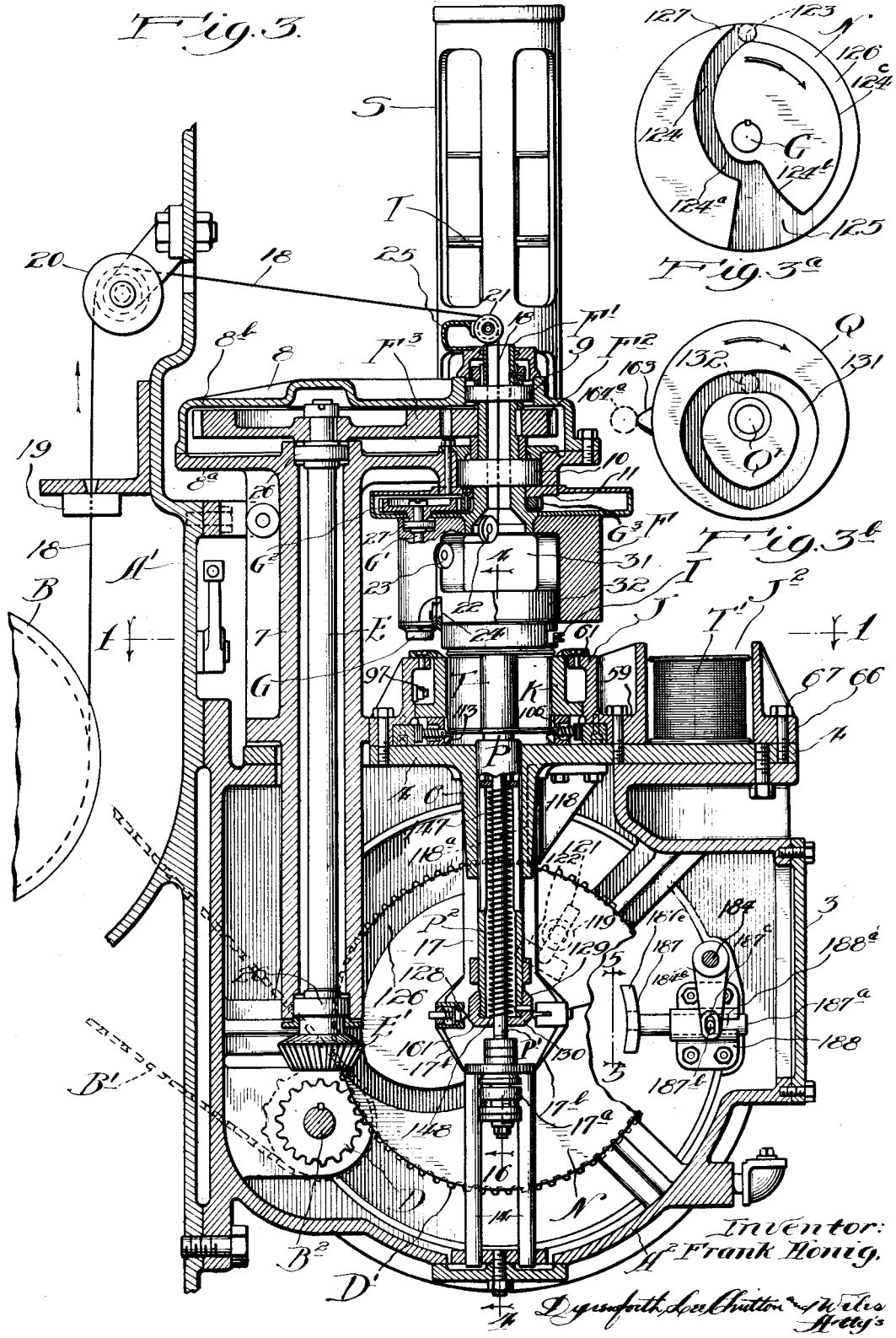

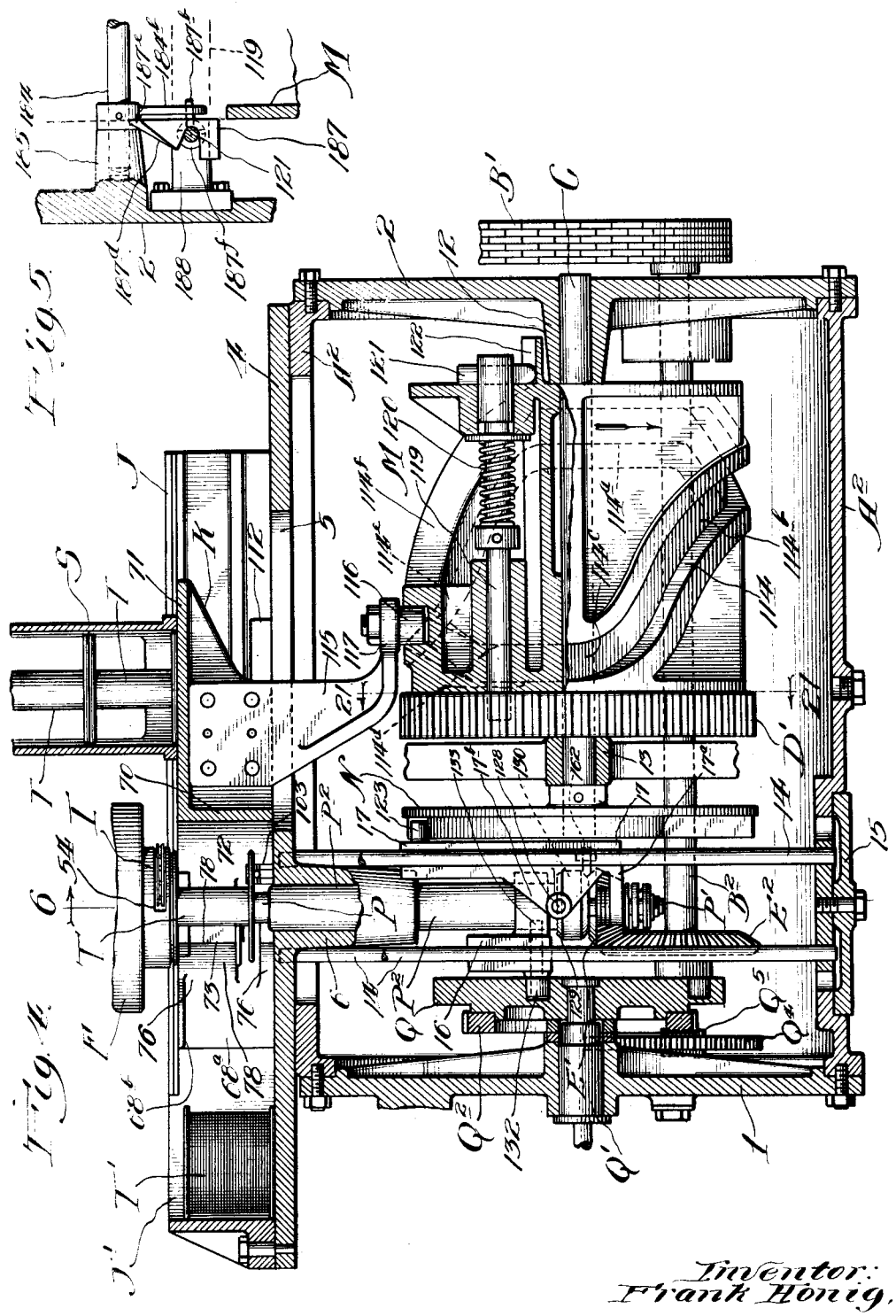

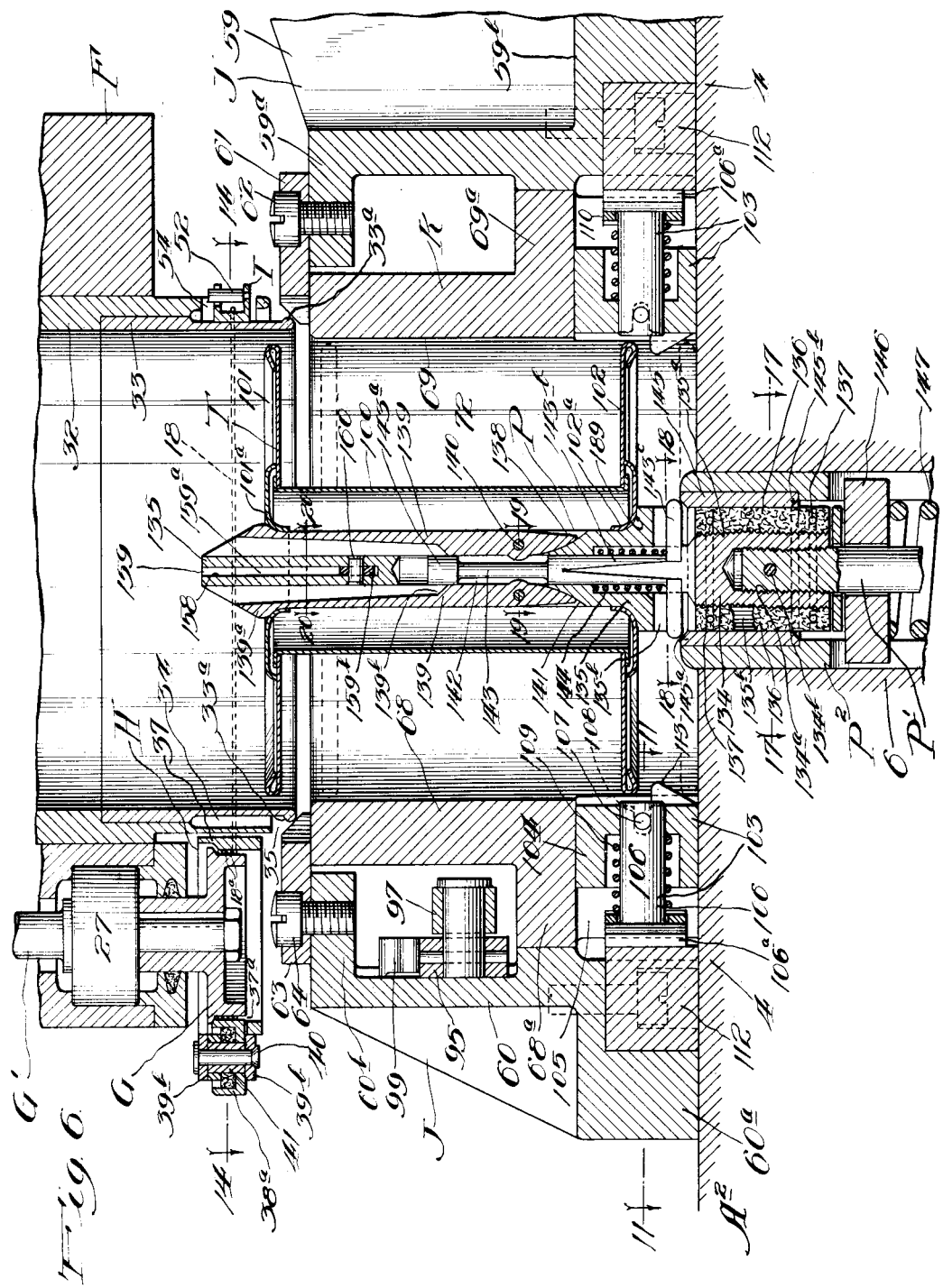

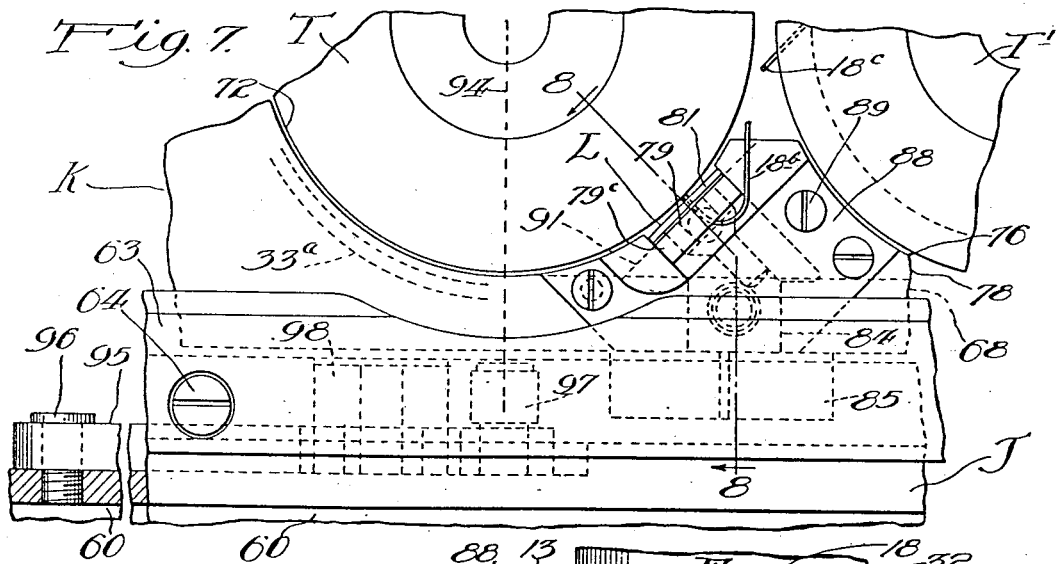

May 3, 1927. 1,627,239
F. HONIG
SPOOLING MECHANISM AND METHOD
Filed Feb. 16, 1924 9 Sheets-Sheet 6
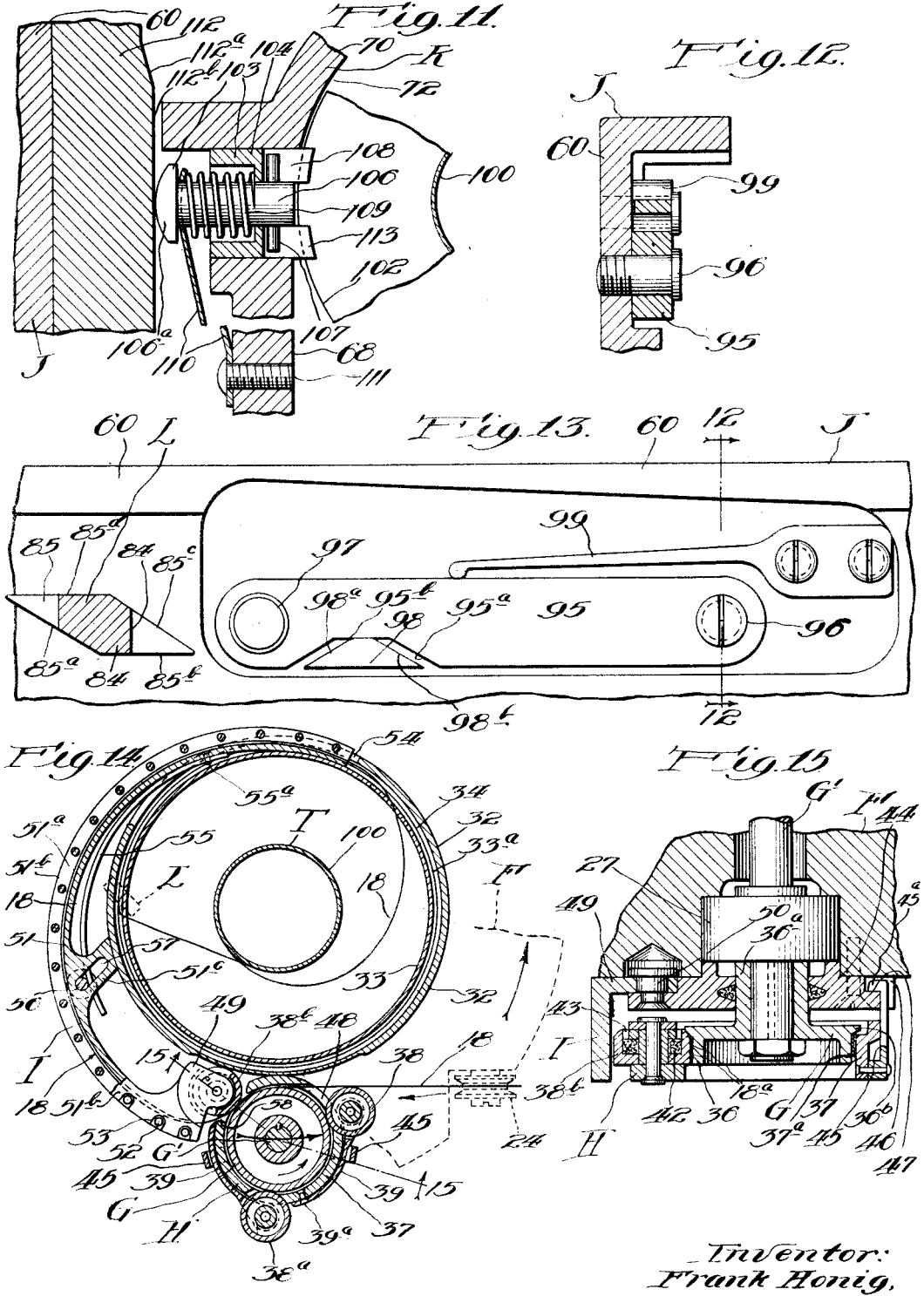
Inventor:
Frank Honig,
by Dyrenforth, Lee, Chritton & Wiles,
Attys May 3, 1927. 1,627,239
F. HONIG
SPOOLING MECHANISM AND METHOD
Filed Feb. 16, 1924 9 Sheets-Sheet 7

Inventor:
Frank Honig
by Dyrenforth, Lee, Chritton & Wiles
Attys

May 3, 1927. 1,627,239
F. HONIG
SPOOLING MECHANISM AND METHOD
Filed Feb. 16, 1924 9 Sheets-Sheet 8
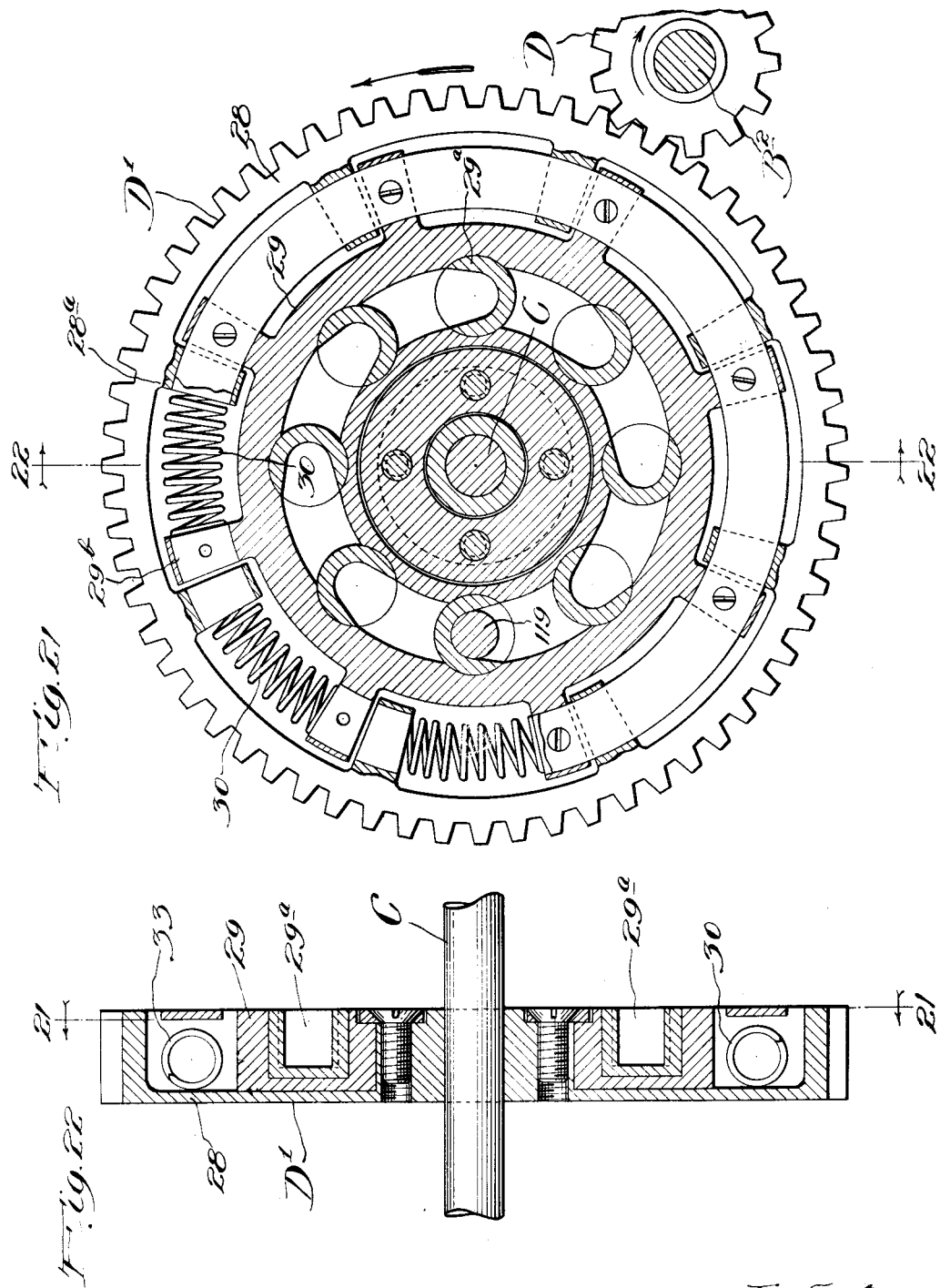
Inventor:
Frank Honig
by Dyrenforth, Lee, Chritton & Wiles,
Atty May 3, 1927. 1,627,239
F. HONIG
SPOOLING MECHANISM AND METHOD
Filed Feb. 16, 1924 9 Sheets-Sheet 9
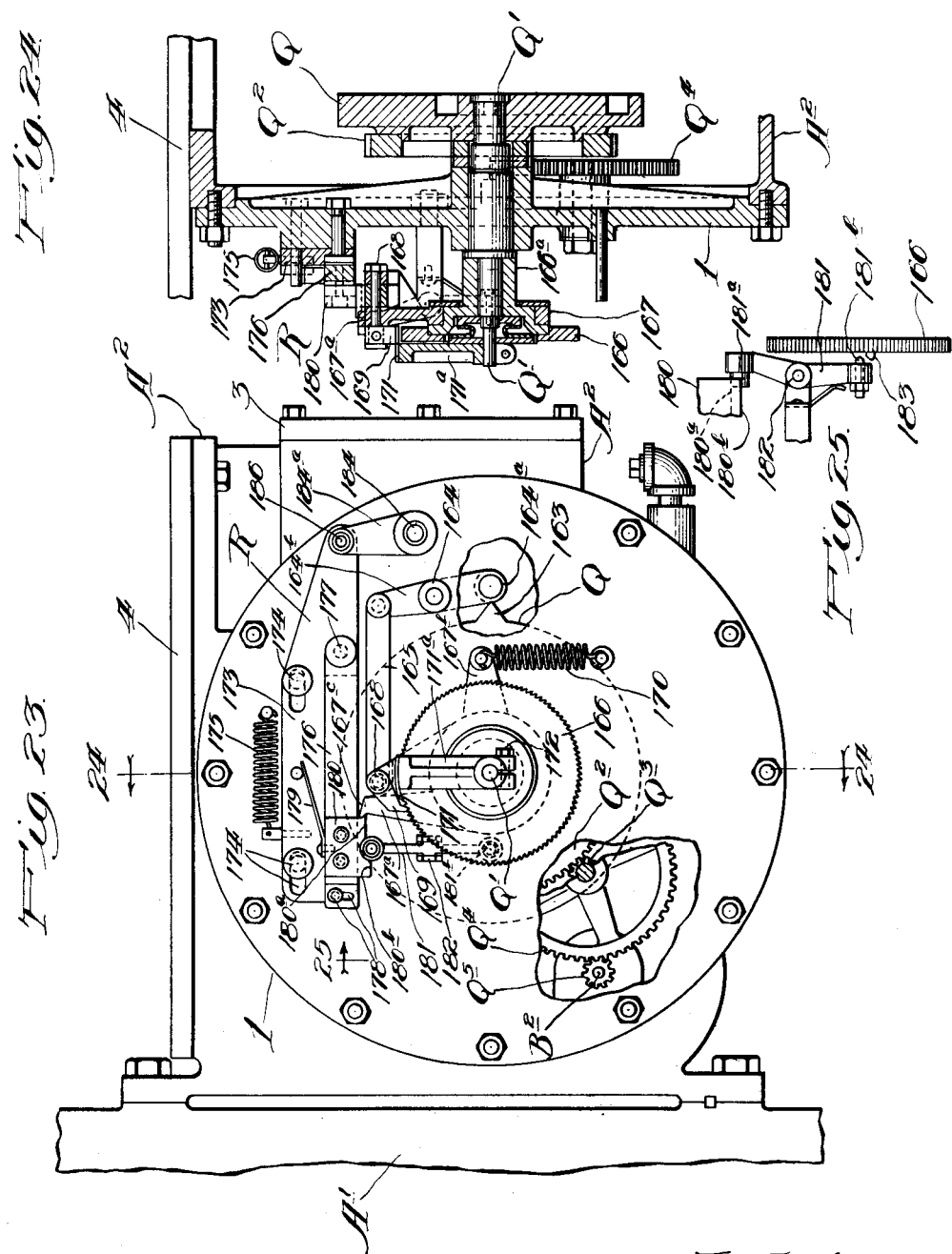
Inventor:
Frank Honig,
by Dyrenforth, Lee, Chritton & Wiles
Attys Patented May 3, 1927.

1,627,239

UNITED STATES PATENT OFFICE.

FRANK HONIG, OF OAK PARK, ILLINOIS, ASSIGNOR TO CYCLO CORPORATION, OF CHICAGO, ILLINOIS, A CORPORATION OF ILLINOIS.

SPOOLING MECHANISM AND METHOD.

Application filed February 16, 1924. Serial No. 693,264.

This invention relates particularly to spooling mechanism and a method of spooling wire, or the like.

The present application is a continuation in part of application, Serial No. 626,834, filed March 22, 1923.

The primary object of the invention is to provide for the automatic spooling of wire, or any other strand-like flexible member. In its broadest aspect, the invention provides for forming a flexible member into convolutions and discharging the convolutions to form a coil, the convolutions being received by a suitable core or spool, and means being provided for effecting relative movement between the convolution-forming mechanism and the coil after the same has been formed, thus enabling a continuous operation to be carried on.

A very important use for the invention is in connection with the drawing of wire, involving a continuous or non-stop process. The invention may be applied, however, to other purposes, as for example the re-coiling of wire. By way of example, it may be stated that it is a common practice in providing insulated electric wires, to take the previously drawn and spooled wire from a spool, apply to it an insulating coating, or a fibrous covering, such as thread, or both. The present invention provides for drawing such wire from a spool or coil and spooling or re-spooling the same, the wire being suitably coated or covered during its passage from the original coil or spool to the mechanism herein described for spooling or re-spooling.

Where the invention is applied to the purpose of a continuous, or non-stop, wire drawing process, the wire may be drawn through suitable dies by means of capstans in accordance with known practice, and finally drawn into convolution-forming and discharging mechanism of the character herein described and formed into coils, or spooled, as desired. The improved mechanism is adapted to exert a pulling action upon the wire while forming the convolutions and discharging them; and, if desired, the wire may be drawn through a finishing die by means of the improved mechanism.

The accompanying drawings illustrate the mechanism adapted to operate, by continuous process, to automatically spool wire and discharge the spools. As indicated above, however, the invention is not limited to the forming of the coils on spools. In a broader sense, the convolutions may be deposited upon any suitable core and thus form a coil on the core.

In the drawings—

Figure 17:
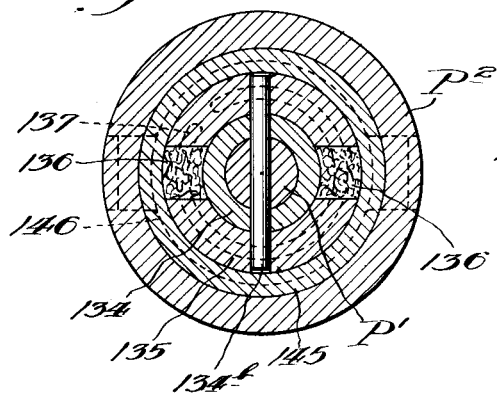
Figure 18:
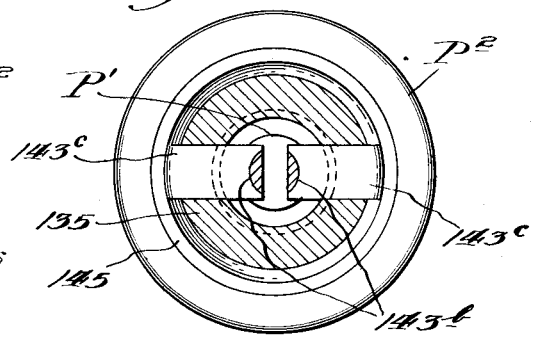
Figure 19:
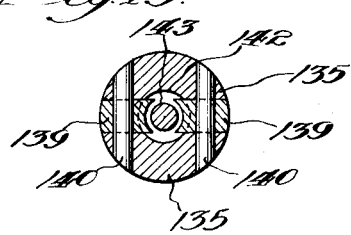
Figure 20:
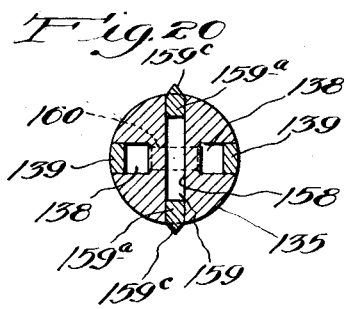

Fig. 1 represents a broken plan view of the improved mechanism, the section being taken as indicated at line 1—1 of Fig. 3; Fig. 2, a broken vertical sectional view showing a detail of the spool-shifting slide, or ejector; Fig. 3, a broken vertical sectional view taken as indicated at line 3—3 of Fig. 1; Figs. 3ª and 3ᵇ, views of cams employed; Fig. 4, an irregular broken vertical sectional view taken approximately as indicated at line 4—4 of Fig. 3; Fig. 5, a broken sectional view taken as indicated at line 5—5 of Fig. 3 and showing a detail of a device for disconnecting the clutch which connects the spool-shifter cam with a continuously rotating gear, said cam being fixed on a shaft upon which is also fixed a stripper-cam which serves to withdraw the impaling device, or arbor, from the spool, it being noted that the device shown in Fig. 5 also serves to lock said cams against rotation during their period of inactivity; Fig. 6, a broken vertical sectional view taken as indicated at line 6 of Fig. 4, this view showing, in section, a spool lifted somewhat above the bottom of the spool guide or channel to permit the spool-shifting slide to be retracted; Fig. 7, a broken plan view of the spool-shifter and its guide, this view showing the shifter at the extreme forward end of its traverse and showing a portion of two spools, the loaded, ejected spool having been moved back somewhat from its ejected position, for the purpose of illustration; Fig. 8, a broken vertical sectional view taken as indicated at line 8—8 of Fig. 7, the view being somewhat in the nature of a development and serving to illustrate the manner in which the wire is caught, held, and severed during the discharge of the loaded spool; Fig. 9, a broken horizontal sectional view taken as indicated at line 9—9 of Fig. 8, the view showing in plan a cam which actuates a vertically movable device mounted on one sidewall of the spool-shifter, said device comprising a hook for catching the wire, a clamp for clamping the wire against said hook, and a knife for severing the wire; Fig. 10, a broken elevational view taken as indicated at line 10—10 of Fig. 9 and showing the wire-engaging hook, the associated clamp, and the associated knife; Fig. 11, a broken horizontal sectional view taken as indicated at line 11 of Fig. 6 and showing a spool-gripper mounted on the spool-shifter; Fig. 12, a broken vertical sectional view taken as indicated at line 12—12 of Fig. 13; Fig. 13, a broken vertical section taken as indicated at line 13 of Fig. 8 and showing an inner side view of one sidewall of the spool-shifter guide, this view showing also the means for actuating the wire-catcher and attendant parts; Fig. 14, a plan sectional view taken as indicated at line 14 of Fig. 6, this view illustrating the planetary capstan and attendant parts, including the lower portion of the rotary shell which carries the capstan and the guide through which the wire is fed from the planetary capstan into an annular passage with which the shell is provided, said annular passage being preferably open at its lower end to afford an annular discharge orifice for the wire; Fig. 15, an enlarged broken vertical sectional view taken as indicated at line 15—15 of Fig. 14, this view showing details of the planetary capstan and the associated guard and gripping means; Fig. 16, an enlarged broken vertical sectional view taken as indicated at line 16 of Fig. 3 and showing a detail of the connection between the lower end of the stem of the arbor, or spool-impaling device, and the cam-actuated member which serves to withdraw the arbor from the loaded spool; Fig. 17, an enlarged horizontal sectional view taken as indicated at line 17—17 of Fig. 6; Fig. 18, a section taken as indicated at line 18—18 of Fig. 6; Fig. 19, a section taken as indicated at line 19—19 of Fig. 6; Fig. 20, a section taken as indicated at line 20—20 of Fig. 6; Fig. 21, a section taken as indicated at line 21—21 of Figs. 4 and 22 and showing details of a gear equipped with shock-absorbing means, said gear being a continuously rotating gear which serves, periodically, to actuate the spool-shifter cam and the stripper cam; Fig. 22, a section taken as indicated at line 22 of Fig. 21; Fig. 23, a broken elevational view of the front side of the mechanism, this view showing control mechanism for periodically causing the actuation of the spool-shifter and arbor-retracting devices, whereby the loaded spool is ejected and a fresh spool introduced at the proper time; Fig. 24, a broken sectional view taken as indicated at line 24—24 of Fig. 23; and Fig. 25, a broken elevational view taken as indicated at line 25 of Fig. 23, this view showing a ratchet wheel and attendant parts.

To facilitate an understanding of the invention, it may be stated here that in the illustration of the method employed, the wire is taken or drawn from any suitable source to a planetary capstan equipped with gripping means and discharged from said capstan into an annular channel at the lower end of the rotary head which carries the capstan; the wire is payed out from the lower end of the revolving head and is wound by a carrying action on the receiving spool which has a slow axial reciprocation to effect distribution of the wire on the spool; and, periodically, the arbor is withdrawn to free the loaded spool, and a spool-shifter operates to eject the loaded spool and to introduce a fresh spool. The capstan is designed to draw and pay out wire at a slightly slower rate than would be required for the wrappings on the core of the spool, so that the wire will be caused to grip the spool and wind closely thereon. As the diameter increases, due to the windings, the spool is caused, by the pull of the wire, to rotate at a gradually increasing rate of rotation. Preferably, the spool-shifter is equipped with a device for catching the wire, severing the wire, and holding the end which protrudes from the shell of the capstan until the winding is properly started on the freshly introduced spool. The device just referred to preferably is so located upon the spool-shifter that it operates to catch the wire, hold it, and effect the severing operation just before the shifter reaches the extreme front of its traverse and the device operates to hold the gripped end of the wire during the initial portion of the return movement of the shifter, during which brief interval the wrapping is properly started on the fresh spool, and the wire is then released from the gripping device carried by the shifter. The arbor, in the illustration given, is depressibly mounted on a vertically movable slide which is given slow movement of reciprocation by a distributor cam, the arbor partaking of the movements of this slide while the spool is being filled. When the loaded spool is to be discharged, the automatic controlling mechanism operates to throw the spool-shifter cam and the stripping-cam into operation, so that the arbor will be wholly withdrawn from the spool and the spool-shifting operation will take place in properly timed relation.

The preferred embodiment of mechanism peculiarly adapted for enabling the improved method to be employed for spooling wire of medium and finer sizes, is shown in the accompanying drawings and will now be described. It should be understood that the invention may be given other embodiments, however.

Referring to the drawings, A represents the frame of the machine, which, in the embodiment shown, comprises a wall A' of a wire drawing machine of any approved construction, and a frame construction A² mounted on the wall A' and carrying the improved spooling mechanism; B, a capstan of the wire-drawing machine mentioned, to which is positively geared, preferably by means of a chain B', the main drive shaft B² of the mechanism which is particularly illustrated in the drawings; C, a cam-shaft parallel with the shaft B² and which has rigidly secured thereon the spool-shifter cam and the stripping-cam; D, (Figs. 1, 3 and 21) a pinion fixed on the shaft B² and meshing with the large gear D' which is journalled on the shaft C and is rotated continuously through the medium of the pinion D; E, a main capstan-driving shaft which is equipped at its lower end with a bevel gear E' meshing with a bevel gear E² (Figs. 1, 3 and 4) which is fixed on the main drive shaft B²; F, a rotary head or shell (Figs. 3, 4 and 6) which constitutes a part of the planetary capstan device employed, and which is equipped with a tubular shaft F' suitably journalled in the frame or housing member and having rigidly secured thereon a pinion F² which is actuated by a gear F³ secured to the upper end of the shaft E, it being understood that the head F may be continuously driven through the gear mechanism described; G, a planetary capstan (Figs. 3, 6, 14 and 15) which is fixed on the lower end of a relatively small vertical shaft G' journalled in suitable bearings carried by the rotary head F, the upper end of said shaft having fixed thereon a gear G² which meshes with a stationary pinion G³ about which the gear G² has a planetary movement; H, a combined guard and gripping-device associated with the capstan and detachably connected with the rotary head F; I, a guide through which the wire is fed from the capstan G to an annular channel with which the rotary head is equipped at its lower end; J, a spool-shifter guide (Figs. 1, 3, 4 and 6) disposed horizontally on the frame of the machine, said guide having at one end a goose-neck extension J' through which the spools pass to a return channel, or spool-guide J²; K, a spool-shifter mounted in the guide J; L, a wire-catching, holding and cutting device (Figs. 1, 7–10 and 13); M, a spool-shifter cam fixedly mounted (Figs. 4) on the shaft C; N, a stripper-cam (Figs. 3ᵃ and 4) fixedly mounted on the shaft C; P, an arbor, or spool-impaling device (Figs. 3, 4, 6 and 16–20), said arbor being equipped with a stem or plunger P' and being yieldingly or depressibly mounted on a vertically reciprocating tubular slide P² which is given a slow but constant movement of reciprocation to effect distribution of the wire on the spool; Q, a distributing cam (Figs. 1, 3ᵇ, 4, 23 and 24), which is journalled on a fixedly mounted stub shaft Q', and which is constantly rotated through the medium of a gear Q² which is fixed thereto, the gear Q² being driven by a pinion Q³ formed integrally with a gear Q⁴ which meshes with the small pinion Q⁵ on the end of the main drive shaft B²; R, control mechanism (Figs. 1, 23–25) mounted mainly on the front side of the frame of the mechanism; and S, a spool-magazine mounted on the shifter-guide J.

The frame A² of the spooling mechanism may be of any suitable construction. It is shown as having the form of a hollow body carried by the wall A' of the frame of a wire-drawing machine. The hollow body frame A² is equipped with a removable front end plate 1 and a removable rear end plate 2. It is also shown provided with a removable side plate 3. The hollow body of the frame A² is equipped with a removable top plate 4 upon which the guide J for the spool-shifter is mounted. The plate 4 forms the bottom wall for the spool-shifter guide and for the extension chute through which the spools are ejected. The plate 4 is provided with a slot 5 for the shank of the spool-shifter and is provided with a depending tubular guide 6 for the tubular distributor slide P². The plate 4 also carries the tubular housing 7 for the main capstan shaft E, and the member 7 carries at its upper end a housing 8 which, in effect, constitutes a hollow arm which projects over the center of rotation of the head F and is provided with anti-friction bearings 9 and 10 for the tubular shaft F'. The housing 8 comprises a lower section 8ᵃ and an upper section 8ᵇ which are bolted together. The lower section 8ᵃ has fixedly secured thereto a ring 11 (Fig. 3) to which is secured the fixed pinion G³.

The frame is provided, as shown in Fig. 4, with bearings 12 and 13 for the shaft C. The frame is provided also with vertical guide rods 14 (shown as four in number) which have their ends received in suitable sockets in the top and bottom walls of the frame, said rods being removable from below, if desired. In Fig. 4, the lower ends of the guide rods are shown disposed above a removable plate 15. The distributor cam Q actuates a cross-head 16 which slides between two of the vertical rods 14 and is rigidly connected with the distributor slide P². The stripper-cam N actuates a cross-head 17 which is guided by two of the rods 14. The lower end of the cross-head 17 has a laterally extending forked arm 17ᵃ (Figs. 4 and 16) which is connected with the stem of the arbor. The cross-head 17, while capable of being depressed by the stripper-cam N, normally reciprocates with the distributor slide P². The cross-head 17 is, for this purpose, equipped with a pair of wings or divergent arms, 17ᵇ (Figs. 3 and 4) which are equipped with releasable catches which engage the distributor slide P² in a manner which will be described later.

The wire is taken, in the illustration given, from the capstan B of a wire drawing machine of any suitable construction. Ordinarily, in such a wire drawing machine, especially in drawing copper wire, the wire is drawn through a series of reducing dies. In Fig. 3, the wire is designated 18. The wire may pass from the capstan B to the capstan device of the spooling mechanism without passing through a finishing die; or, if desired, the wire may be taken through a finishing die, as indicated at 19 in Fig. 3. The wire is shown as passing over an idler 20, thence to an idler 21 disposed above the tubular shaft F', thence to an idler 22 journalled in the interior of the rotary head, thence to an eccentrically located idler 23 journalled in the rotary head, thence to an idler 24 at the lower end of the rotary head, and thence to the planetary capstan G. The idlers 21 and 22 are preferably so disposed that the vertical portion of the wire 18 extends along the axis of rotation of the rotary head F, this being also the axis of the planetary movement of the capstan G. The purpose is to prevent any variation in the length of wire between the planetary capstan and its source of supply. It is preferred also to have the idlers 21 and 22 of the same size, so that in case of any possible variation of one or the other from the center line, the length of wire, nevertheless, will not vary appreciably. To compensate for any possible inaccuracy of construction, the roller 21 may be mounted on a spring mounting 25 carried by the housing 8.

The details of construction whereby the tubular shaft F' and the rotary head F are suitably journalled in the anti-friction bearings 9 and 10 may vary greatly. As shown, provision is made for removability of the head and its shaft from the bearings. As has been stated, the gear F² is fixedly secured to the tubular shaft F'. It may, however, be removed from the shaft.

In practice, it may be necessary for the head or shell F of the planetary capstan device to rotate very rapidly, especially when wire is being wound on spools of small size. Accordingly, the main capstan shaft E is equipped with anti-friction bearings 26. Also, the planetary capstan G rotates very rapidly and the shaft G' is equipped, as shown in Figs. 3, 6 and 15, with anti-friction bearings 27.

The construction of the gear D' which is journalled to rotate on the shaft C is shown, in detail, in Figs. 21 and 22. To overcome the shock from the inertia of the spool-shifter cam and stripper-cam and the parts operated thereby at the moment when the cams are thrown into action, the gear D' preferably is constructed in two parts which have a series of coil springs interposed to absorb the shock. Thus, the gear is shown as comprising an outer portion 28 and a center portion 29, which are capable of angular movement with relation to each other. The direction of rotation of the gear is shown by the arrow in Fig. 21. The central portion 29 is shown provided with a series of clutch-sockets 29ª, any one of which may be engaged by a clutch-plunger mounted in the spool-shifter cam M. The outer portion of the gear is equipped with lugs 28ª which co-act with lugs 29ᵇ carried by the central portion 29. Between these lugs are confined coil-springs 30. When one of the sockets 29ª is engaged by the clutch-plunger of the cam M, the center 29 is momentarily retarded, while the gear D continues its rotation compressing the springs 30. The springs recover, and return the parts to their normal position with relation to each other.

As has been stated, the main capstan shaft E of the planetary capstan mechanism, is driven continuously from the main shaft B² of the wire-drawing and spooling mechanism through the medium of the bevel gears E' and E². From the description already given, it will be understood that this causes continuous rotation of the head or shell F by which the capstan G is carried in a planetary manner and also the capstan G is positively rotated on its own axis during its planetary movement.

The construction of the rotary head or shell F of the planetary capstan device will be understood, in detail, from Figs. 3, 6, 14 and 15. The head F preferably is formed from a very strong light metal. A suitable alloy of aluminum, such as is known on the market as "duralumin", answers the purpose well. The head F is shown as comprising a shell having walls of substantial thickness, said shell being opened at its lower end and provided at its sides with cutaway portions, of segmental slots 31. In Fig. 3, the head is shown partly in section and partly in elevation, in order that the threading of the wire may be seen more clearly. The annular wall of the head is provided at one side with a vertical passage for the shaft of the planetary capstan G and the bearings of said shaft.

Fitted in the lower portion of the annular head F is a steel shell 32 which has its lower portion recessed interiorly and fitted with an inner shell 33, as most clearly is shown in Figs. 6 and 14. The extreme lower end of the shell 32 is reamed out, and the shell 33 is recessed exteriorly, thus providing between the shells an annular channel 34 into which the wire is fed through the guide I from the planetary capstan G. The lower end of the inner shell 33 preferably is provided with an exterior bead 33ª over which the wire plays as it passes from the space 34 to the receiving spool. The lower end of the shell 32 is disposed a little above the plane of the bead 33ª, thus leaving an annular orifice 35 through which the wire can be payed out as it passes to the spool, as will be best understood from Figs. 6, 8 and 14.

Referring to Figs. 6, 14 and 15, the capstan G is shown as comprising a small drum 36 provided with a hub 36ª which is rigidly mounted on the lower end of the shaft G'. A few convolutions 18ª of wire are passed about the capstan and are engaged by the gripping device H which encircles the capstan. The outer surface of the capstan upon which the convolutions are wound preferably is a cylindrical surface and this surface preferably is somewhat roughened to insure a better gripping action. The roughened surface may arise from the character of the material of which the capstan is made, or it may be formed by the finishing cut of the tool without a polished or ground surface being produced. The upper end of the capstan is shown provided with a bevelled flange 36ᵇ. As the wire passes from the idler 24 to the capstan, the first convolution is placed adjacent the bevelled flange and the convolutions are successively crowded down as a new convolution is formed, the wire progressively passing from the capstan, after emerging from beneath one of the rollers of the gripping device, and being fed through the guide I to the rotating head.

The combined guard and gripping device H preferably comprises a short cylindrical member 37 which encircles the capstan G, leaving, however, a very small annular space 37ª between it and the capstan. The cylindrical member 37 is provided with cutaway portions, or slots, through which project presser rollers 38, 38ª, and 38ᵇ. The rollers 38 and 38ª are journalled on springs 39 secured by rivets 39ª to the cylindrical member 37. As appears in Fig. 6, each spring has furcations 39ᵇ joined by a rivet 40. Between the furcations is confined a bushing 41 on which the roller 38 or 38ª, as the case may be, is journalled.

The gripping rollers are alike in construction. In Fig. 15, the roller 38ᵇ is shown journalled in a slot in the ring or cylinder 37. Each roller is provided with a chamber which contains felt or similar material 42, adapted to absorb oil. Oil may be introduced through a perforation 43 in the upper wall of said chamber.

The hub 36ª of the capstan G is shown extending through a packing gland 44 which is secured by screws to the lower end of the rotary head F. The gland is provided with a flange which forms one of the confining walls of the anti-friction bearings 27. The frame or ring 37 of the combined guard and gripping device H is shown equipped with a pair of rigidly attached spring arms 45 whose upper ends are provided with catches 45ª which take in two recesses 46 with which the gland 44 is provided, and engage shoulders 47 which serve to support the combined guard and gripping device. The notches or recesses 46 serve to prevent angular movement of the gripping device.

When it is desired to remove the device H from the capstan G, this may be accomplished by forcibly separating the spring arms 45 and then moving the device H downwardly. The relation of the idler 24 to the capstan G is shown in Fig. 14, where the dotted lines indicate a portion of the rotating head F disposed above the plane of the capstan. The wire comes down from the idler 23, as shown in Fig. 3, passes about a portion of the idler 24, and thence from the lower side of the idler 24 to the capstan. The wall 37 is provided with a slot or perforation 48 which is so disposed as to admit the wire tangentially to the capstan between the presser-rollers 38 and 38ᵇ. The wire 18 then makes a few turns about the capstan, and finally, as it emerges from between the roller 38ᵇ and the capstan, it passes through the guide I to the annular space 34. The gripper rollers apply pressure to the convolutions on the capstan and cause the convolutions to grip the capstan throughout the area of contact with the capstan. Ordinarily, buckling of the wire between the gripping rollers does not occur. However, with very fine, soft, flexible wire, where the conditions are not entirely normal in wire or mechanism, a tendency toward buckling may appear. Such tendency to buckle is overcome by the annular wall afforded by the member 37. While the space 37ª may be several times the diameter of the wire, as soon as incipient buckling occurs, the wire will be confined by the wall of the guard, so that the operation of the mechanism will not be impeded or interrupted. As shown in Fig. 15, the guide I is provided with an angular shank 49 which is connected with a vertical pivot 50 carried by the gland 44. The guide I pivots freely on the supporting pivot 50 and can swing about this pivot as a center. The guide is in the form of a crescent-shaped member 51 which extends part way about the circumference of the shell 32. The crescent-shaped member 51 is provided at its outer side with a groove 51ª through which the wire passes, the channel 51ª is flanked above and below by flanges 51ᵇ. As appears from Figs. 6 and 14, the lower flange has secured thereto a series of studs 52, and the upper flange is provided with registering recesses 53, which, however, are somewhat larger than the studs, so that there is a clearance between the upper ends of the studs and these recesses. The wire may be threaded through the guide by passing a loop about the upper end of the first stud, then about the upper end of the second stud, and so on, in succession. The free end of the member 51 is adapted to swing somewhat in a segmental slot 54 with which the outer shell 32 is provided near its lower end, as will be understood from Figs. 6 and 14. When the head rotates, the tendency is for the centrifugal force to throw the free end of the segmental guide 51 outwardly. This tendency is yieldingly counteracted by a crescent-shaped spring 55 which is secured to the vertical wall of the crescent-shaped guide by a rivet 55ª. The free end of the spring 55 bears against a vertical stud 56 which depends from the lower end of the head F, so that the tendency of the spring is to prevent the crescent-shaped guide from swinging outwardly. The guide member 51 is equipped at its inner side with a lug 51ᶜ which may bear against the outer surface of the shell 32 in the position shown in Fig. 14. The lug 51ᶜ is provided with a vertical slot 57 through which the stud 56 extends, and the inner end of this slot limits the outward swing of the member 51 when it is moved outward by centrifugal action. In the normal operation of the machine, the head F rotates so rapidly as to cause the member 51 to swing outwardly somewhat against the force of the spring 55, thus creating a certain amount of tension on the wire passing from the planetary capstan to the spool. Any slight variations in the length of the wire between the planetary capstan and the spool will thus be compensated for by the yielding member 51. Thus, it will be understood that ordinarily when the wire is being wound on the spool, the wire between the planetary capstan and the spool is under a certain amount of tension. The wire, after making a few turns about the capstan, emerges from beneath the presser-roller 38ᵇ, passing through the slot which accommodates said roller, and the wire then follows the curved course of the guide member 51. At the point where the wire passes from beneath the roller 38ᵇ, the wall 58 of the slot which accommodates the roller affords a curved shoulder which may serve as a wire-bending shoulder. It will be noted from Fig. 14 that the wire, in passing from the planetary capstan G to the rotary head is curved back away from the capstan, instead of taking a curve corresponding more closely with the bend due to the formation of the convolution on the capstan. In other words, if we consider the entrance of the wire to the capstan G from the idler 24 and then away from the capstan and through the guide member 51, the wire is, in effect, passing through a reverse loop and the portion which passes to the spool trails behind the capstan G as the capstan G is carried in a planetary course in the direction indicated by the arrow in Fig. 14. At the moment of shifting spools, there ordinarily occurs some slack in the wire between the capstan G and the spool. At this moment, the bending shoulder 58 performs the function of bending the wire away from the capstan G and directing it through the guide 51, the capstan serving all the time to discharge the wire from itself and also to maintain an uninterrupted tension upon the wire which is being drawn onto the capstan.

In a machine so designed as not to cause the wire to grip the core or spool on which the wire is being deposited, the tension between the core and the planetary capstan would disappear, or be very light. In such a case, the shoulder 58 would continuously perform the bending function, and the self-discharging capstan would continue to feed the wire backwardly through the guide 51 while the capstan moved forward in its planetary path.

The spool-shifter guide J comprises preferably castings 59 and 60, as will be understood more readily from Figs. 1 and 6. The casting 59 is in the form of a long strip of substantially U-formed cross-section, one side of which forms the inner wall 59ª of the discharge chute J². The base portion 59ᵇ of the member is secured, by cap screws 59ᶜ, to the top plate 4. The member 59 has an inturned upper flange 59ᵈ upon which is secured an overhanging guide strip 61 which is secured in position by cap screws 62. The other casting 60 is in the form of a Z bar having a base flange 60ª and an inturned top flange 60ᵇ. This casting is secured to the plate 4 by means of cap screws 60ᶜ. Upon the flange 60ᵇ is mounted an overhanging guide strip 63 which is secured in position by cap screws 64.

The goose neck J' is formed by mounting a half-ring of L-shaped cross-section upon an extension of the plate 4, the member mentioned being secured to the plate 4 by cap screws 65. The outer wall of the discharge chute J² is formed by mounting an angle-shaped bar 66 on the plate 4, cap screws 67 being employed to secure it in position.

The spool-shifter K, whose function it is to eject the loaded spool and introduce a fresh spool, will be best understood by reference to Figs. 1, 4, 6 and 7–13. It preferably comprises a casting having sidewalls 68 and 69 whose base portions are provided with outturned flanges 68ª and 69ª. The casting comprises also a connecting web 70 between the vertical walls mentioned and a top wall 71 at the rear portion of the slide which serves, as shown in Fig. 4, to support the spools in the magazine S when the slide is in the advanced position. The slide or shifter is provided further at a distance from its front end with a circular vertical passage 72 whose walls form a continuation of the web 70. The passage 72 receives the spool which is to be shifted to the loading position. The web 70 which is curved to form both the rear and sidewalls of the circular passage 72 extends some distance in front of the axis of the opening and the ends of the sidewalls terminate at the points 73, as shown in Fig. 1, thus leaving between said points a space 74. In front of the spool chamber 72 of the spool-shifter, there is provided a second chamber 75 which is open at its front end, and which, at its rear end, is provided with the curved shoulders 76 and 77 which serve to engage the flanges of the loaded spool to cause ejection of the spool. The sidewalls of the shifter are provided with forward extensions 68ª and 69ª equipped with inturned overhanging flanges 68ᵇ and 69ᵇ, as will be clearly understood from Figs. 1, 2 and 4. The purpose of the extensions and flanges just described is to steady the discharged spool while it is being ejected.

There are two of the curved surfaces 77 formed respectively in the upper and lower inwardly extending flanges with which the spool-shifter is provided. Similarly, as shown in Fig. 4, there are two of the curved surfaces 76, the lower of which is formed by a lower internal flange and the upper of which is formed as one surface of an internal boss 78 formed on the sidewall 68 of the spool-shifter. The boss 78 is utilized as a housing for the wire-catcher and the associated parts, L, as will be best understood from Figs. 7–9.

The device L comprises a hook 79, a wire-clamping bar 80 co-acting with said hook, and a knife 81 co-acting with said hook. The hook 79 is formed at the top of a vertically reciprocable bar 79ª which moves in a vertical guide 82 with which the boss 78 is provided, said guide being obliquely placed. The lower end of the bar 79ª is secured, by a screw 83 to a vertical, oblique surface of a shank 84 which projects from a cam 85 which is disposed outside the vertical sidewall 68 of the spool-shifter. The shank 84 reciprocates vertically in a guide slot 84ª with which the wall 68 is provided. The cam 85 is carried with the spool-shifter, being located in a space 86 between the sidewall 68 of the spool-shifter and the guide member 60. A spring 87 which is set in the socket with which the shank 84 is provided and whose upper end bears against a removable plate 88 mounted on the boss 78 tends to hold the hook depressed. The outline of the plate 88 is shown in Fig. 7. This plate is set into a recess at the top of the boss 78 and is secured in position by screws 89. The bar 79ª is provided with a slot or guide 79ᵇ which receives the plunger or clamp bar 80. The guide slot 79ᵇ is open at its front side, and the plunger 80 is confined in the guide slot by the knife plate 81. The knife plate is provided at its lower end with an outturned flange 81ª which is secured, by a rivet 90 to a supporting plate 91, which is secured to the bottom of the boss 78, by screws 91ª. The outline of the supporting plate 91 is approximately the outline of the lower end of the boss 78, and the top surface of the plate 91 is flush with the lower end of the slot 84ª. Between the plate 91 and the lower end of the clamping plunger 80 is confined a spring 92, which tends to hold the clamping plunger elevated above the knife edge 81ᵇ, as shown in Fig. 10. The upward movement of the clamping plunger is limited by a pin 93 which engages a slot 93ª with which the knife plate 81 is provided.

It will be noted that the wire-catching, holding, and severing device, L, is positioned on the spool-shifter between the spaces for the spools, or, in other words, just in advance of the fresh spool and at one side thereof. The point of the hook 79 is designated 79ᶜ. The hook points rearwardly, but is set obliquely, as appears from Fig. 7. A portion of the annular lip or bead 33ª, over which the wire is payed as it passes downwardly to the spool, is shown in dotted lines in Fig. 7. During the forward travel of the spool-shifter, the hook is lifted. This action occurs just after the hook passes the lip 33ª in the forward movement of the shifter, and the hook is carried in the elevated position within the inner shell for an interval of time, during which the wire is carried around to form a convolution and is caused to engage the hook. The hook is lowered, however, before it reaches the position shown in Fig. 7, thus drawing the wire down to a position beneath the upper flange of the entering spool, as shown in Fig. 8. As the hook descends, its clamping surface 79ᵈ (Fig. 10) clamps the wire against the upper end of the plunger 80. In the further downward movement of the hook, the plunger 80 recedes, and finally the wire is severed by a shearing edge 79ᵉ with which the hook is provided, acting in conjunction with the shearing edge 81ᵇ of the knife 81. This leaves one end of the severed wire (the outer end of the wire of the loaded spool) free, and leaves the end of the wire which comes from the rotating head gripped in a manner illustrated in Figs. 7 and 8. It must be borne in mind, however, that the severing action occurs immediately after the hook passes the transverse center line of the rotating head of the mechanism, which corresponds with a dotted line 94, in Fig. 7; and it is to be borne in mind that in Fig. 7, the slide has moved forward from the severing position to the extreme forward end of its traverse, during which movement the hook was in the lowered position so as to pass beneath the lip 33ª of the rotary head. In Figs. 7 and 8, the gripped end of the wire which extends from the rotary head is designated 18$^b$, and the final end of the loaded spool is designated 18$^c$. In Fig. 7, however, the ejected spool has been brought back to a position against the advanced end of the spool-shifter, although, in reality, the momentum of the ejected spool would carry it further forward before the ejector slide would slow up and come to a stop.

The form of the cam 85 which forms a part of the mechanism, L, is shown in Fig. 13. The cam is of approximately diamond form, with the long axis inclined slightly. Mounted on the inner surface of the vertical wall 60 of the guide J is an arm 95 which is pivotally secured to said wall by a pivot 96. The free end of the arm 95 is equipped with a roller 97. The arm 95 is provided at its lower edge near its free end with a recess 95$^a$ which has inclined walls which meet a horizontal wall 95$^b$ at the central portion of the recess. Projecting from the wall 60 of the guide J is a cam 98 which has inclined walls 98$^a$ and 98$^b$. The member 98 normally forms a rest for the free end of the arm 95. A spring 99 yieldingly holds the arm 95 in the position shown in Fig. 13. The cam 85 is provided with an inclined lower front surface 85$^a$, and, in the rear of this, with a horizontal surface 85$^b$. The cam is further provided with a rear inclined upper surface 85$^c$ and a horizontal upper surface 85$^b$. As the spool-shifter moves forward, the inclined surface 85$^a$ rides over the fixed cam 98$^b$ and then over the roller 97, thus lifting the wire-catching hook and holding it elevated until the cam drops off the roller 97. On the return stroke of the spool-shifter, the inclined surface 85$^c$ rides under the roller 97, and the lower surface 85$^b$ then rides over the cam 98. Thus, in the return movement of the spool-shifter, the hook is lifted a short distance, thus freeing the gripped wire after the first wrappings on the freshly introduced spool have been made. The releasing action occurs preferably at about the time the hook is passing the center line on the return stroke, as will be understood by reference to Fig. 7.

The empty spools are designated T, and the loaded spool is designated T'. Ordinarily, spools of this character are formed from sheet metal and have, as shown in Fig. 6, a hollow barrel or core 100, an upper external flange 101, and a lower external flange 102. The spool also has an internal upper flange 101$^a$ and an internal lower flange 102$^a$.

Referring again to the spool-shifter K, the base portions of the sidewalls 68 and 69 are equipped at diametrically opposite points with respect to the spool chamber 72 with grippers 103 which are adapted to grip the lower flange of the spool as the spool is carried forward to a position beneath the rotating head. The construction and action will best be understood by reference to Figs. 6, 8, and 11. Each gripper 103 comprises a gripper-block 104 adapted to slide in a transverse slot 105 with which the sidewall of the spool-shifter is provided; a cam-actuated plunger 106 movable through a central perforation with which the block 104 is provided and equipped with a fixedly mounted transverse pin 107 which is accommodated by an opened-end slot 108 with which the gripper-block is provided at its inner end; a coil-spring 109 confined between the head at the outer end of the plunger 106 and the bottom of a socket with which the gripper-block is provided, and a leaf spring 110, the advance ends of the springs 110 being secured to the sidewalls of the spool-shifter by means of screws 111, as shown in Fig. 11. The springs 110 tend to throw the plungers 106 outwardly. The inner surfaces of the sidewalls of the guide J are equipped with fixedly secured longitudinal cams 112 which are provided with convergent surfaces 112$^a$ and with parallel surfaces 112$^b$. Fig. 11 shows the lower flange of a spool engaged by a gripper, the rounded head 106$^a$ of the plunger 106 having been pressed inwardly by the cam 112 during the advance movement of the spool-shifter. The purpose of the grippers 103 is to grip the lower flange of the spool in such a manner as to hold the spool securely while the arbor is entering the spool. In Fig. 6, the position is shown after the arbor has entered the spool and has then lifted the spool a sufficient distance to permit retraction of the spool-shifter, it being noted that the lower flange 102 of the spool is, at this point, sufficiently elevated to be above the flanges which form the lower engaging surfaces 76 and 77 which serve to engage the lower flange of the spool which is being ejected. Also, in Fig. 6 the upper flange 101 of the spool is located wholly above the plane of the spool-shifter. Thus, the spool-shifter can be retracted without striking the freshly introduced spool.

The inner ends of the gripper-blocks 104 are provided with undercut projections 113. These projections are made concave to conform generally to the contour of the flange of the spool and are adapted to overlie the flange of the spool, but, at the same time, engage it, so that the lower flange of the spool will be held against the top surface of the plate 4 which forms the lower wall of the guide. However, the springs 109 are sufficiently yielding to permit the gripper-blocks to recede as the spool is forced upwardly by the arbor after the arbor has properly entered the spool. The inclined undercut surfaces of the projections 113 permit this action.

The cam M which serves to actuate the spool-shifter K is, as has been stated, rigidly secured on the shaft C. The same is true of the stripper-cam N. The cam M is of the drum type, and is provided with a cam-channel 114 which is adapted to give the desired movements to the spool-shifter K. The form of the cam-channel will be described later. The spool-shifter K is equipped with a depending shank 115 which, in turn, is equipped with a cam roller 116, which engages the cam groove 114. The lower end of the stem 115 is provided with a lateral bearing surface 117 which bears against a vertical longitudinal guide member 118 which is secured, as shown in Fig. 3, to the lower side of the top plate 4 of the frame. The member 118 has the guide surface 118$^a$ which is engaged by the bearing surface 117, shown in Fig. 4. The rotation of the cam M in the direction indicated by the arrow in Fig. 4 has a tendency to carry the roller 116 with the cam, and this is counteracted by the bearing surface 117 engaging the bearing surface 118$^a$ during the movements of the spool-shifter.

Extending longitudinally through the cam M is a clutch-plunger 119 which, in the illustration shown in Fig. 4, has its forward end engaging one of the sockets 29$^a$ of the rotating gear D'. The plunger is equipped with a spring 120 which tends to throw it into clutching engagement with the gear. The rear end of the plunger projects from the cam M and is equipped with a transverse stud 121 which is adapted to be engaged for the purpose of retracting the clutch-plunger by a member which will be described later, which member constitutes, in effect, a part of the control mechanism R. The stud 121 constitutes a portion of a pin which extends through the plunger 119 and has its inner end engaging a longitudinal guide 122 which projects from the end of the cam M. The purpose of this guide is to prevent rotation of the plunger 119 on its own axis, in order that the stud 121 may always be in position to be engaged by the retracting member at the proper time.

The arbor P will be understood by reference to Figs. 3, 6, and 16–20. As has been stated, it is depressibly mounted on the continuously reciprocating tubular distributor slide P$^2$ and partakes of the comparatively slow reciprocating movements of that slide while the spool is being filled. When the spool-shifter cam M is thrown into action, however, the stripper cam N is simultaneously thrown into action. At this moment, the cam-roller 123 of the cross-head 17 (Figs. 3$^a$ and 4) is, at the lower end of its normal path of reciprocation, during the filling of the spool, in position to be engaged by the stripper-cam N. The cam N is so designed as to quickly withdraw the arbor from the loaded spool. As shown in Fig. 3$^a$, the cam N is provided with a groove 124 which is so shaped as to effect a quick lowering action in withdrawing the arbor from the spool. The groove 124 terminates at its inner end in a short groove 124$^a$ of small radius which corresponds with a moment of dwell of the arbor at the extreme lower end of its traverse, that is, at the end of the stripping action. The cam is further provided with the cam surface 124$^b$ which corresponds with a quick rise of the arbor to the impaling position, and a concentric cam surface 124$^c$ of large radius. The cam is open at the points 125 and 126, the purpose being to permit the spring of the arbor to quickly elevate the arbor and cause it to enter the fresh spool when it reaches the filling position, and thereafter to permit the arbor to reciprocate with the distributor slide, it being understood that the cam roller 123 reciprocates normally in a path above the point 123 shown in Fig. 3$^a$, while the spool is being filled. When the spool is to be discharged, however, it is always in the lowered position, near the bottom of the guide through which the spool-shifter works, and thus the cam-roller 123 is in position to be engaged by the overhanging lip 127.

For the purpose of releasably connecting the cross-head 17 with the distributor slide P$^2$, the wings 17$^b$ of said cross-head are equipped with spring-pressed plungers 128 which have their inner ends bevelled or pointed and adapted to rest on the bevelled upper surface 129 of a collar 130 mounted on the tubular distributing slide P$^2$.

The tubular distributing slide P$^2$ works through the tubular boss 6 and a concentric perforation in the plate 4 from which said boss depends, as will be understood from Fig. 3. As has been stated, the cross-head 16 is actuated by the continuously rotating cam Q. This cam has a cam groove 131 of the form shown in Fig. 3$^b$, said cam groove being designed to uniformly reciprocate the cross-head 16. The cross-head 16 is equipped with a cam roller 132 which engages the groove 131. The position of the roller which is shown in Fig. 3$^b$ corresponds with the lowermost position of the distributor slide P$^2$. The cross-head 16 is secured to the tubular slide P$^2$ by means of a connecting stud 133. In its lowermost position, the upper end of the tubular member P$^2$ is about flush with, or slightly below, the upper surface of the top plate 4.

The details of construction of the arbor P will best be understood from Figs. 3, 6, and 16–20. In the form of construction illustrated, which may be varied, there is mounted on the upper end of the plunger P' a connecting plug 134, upon which is mounted the arbor head 135. The plug 134 is provided with a threaded bore 134$^a$ into which is screwed the threaded upper end of the plunger P'. The parts are further secured together by means of a pin 134ᵇ. The outer cylindrical surface of the plug 134 is threaded and screwed into a threaded bore 135ᵃ with which the member 135 is provided at its lower end. The base portion of the member 135, which is thus in form of a shell, is provided with vertical slots 135ᵇ which extend some distance above the upper end of the plug 134. Strips of felt 136 are inserted in those portions of the slots which are opposite the plug 134. These strips of felt are held in position by split wire rings 137. The member 135 is provided with vertical slots 138 in which are mounted a pair of gripper levers 139. These members are supported near their lower ends on transverse pivots 140. The lower extremities of the levers are adapted to bear against tapered surfaces 141 formed at the bottoms of the slots. At their upper ends the levers 139 are provided with rounded projections 139ᵃ which are adapted to grip the inner top flange 101ᵃ of the spool. Inside the levers 139, the member 135 is provided with a bore 142 in which operates a small plunger 143, which has a head portion 143ᵃ which is adapted to serve as a wedge between the gripper levers 139. The inner surfaces of the levers 139 are provided with tapered cam surfaces 139ᵇ which converge downwardly. When the plunger 143 is depressed with relation to the arbor, the head 143ᵃ is disposed so as to hold the upper ends of the levers separated. The upper end portions of the levers are of reduced cross-section and thus serve as springs adapted to yieldingly hold the gripping projections 139ᵃ in gripping contact with the flange of the spool. The lower end portion of the plunger 143 is split or slitted longitudinally, thus forming furcations 143ᵇ; and these furcations are provided at their lower ends with radially projecting arms 143ᶜ, which extend through the slots 135ᵇ and project slightly beyond the circumferential surface of the base portion of the arbor. A spring 144 confined in a socket above the arm 143ᶜ tends normally to depress the plunger 143.

As will be explained more fully later, the arbor is designed to rotate within the distributing sleeve P². Accordingly, the upper end of the sleeve P² is provided with a hardened steel bushing or bearing 145.

The upper end portion of the plunger or arbor stem P' is equipped with a collar 146 against which the upper end of a long coil spring 147 bears, as shown in Fig. 6. The lower end of said spring bears, as shown in Fig. 3, against an internal flange 148 with which the collar 130 is provided at its lower end. The flange 148 is provided with a central perforation through which the stem P' is adapted to move freely.

The lower end of the arbor stem P' is threaded and passes freely through a perforation 149 in the laterally turned arm 17ᵃ at the lower end of the cross-head 17. For the purpose of providing adjustable friction between the lower end of the arbor stem and the arm 17ᵃ, the threaded stem is fitted loosely with bearing washers 150 and 151 which embrace the upper and lower surfaces of the arm 17ᵃ. Lock nuts 152 threaded on the stem P' are disposed above the washer 150. The lower washer 151 is engaged by the upper ends of small coil-springs 153 which extend freely through bores in a flange of a nut 154 which is screwed onto the lower end of the arbor stem and is secured in position by lock nut 155. The lower ends of the compression springs 153 bear against an adjustable nut 156 screwed onto a reduced extension 154ᵃ of the nut 154. A companion lock nut 157 serves to prevent the nut 156 from working loose. By means of the construction just described, suitable friction may be applied to prevent the arbor from rotating too freely within the distributor slide, it being understood that the arbor rotates with the spool and that the spool is rotated by the wire to compensate for the enlarging diameter as the layers of wire accumulate on the spool. The tightness of the winding of the wire on the spool is regulated by the means just described.

It should be stated further with reference to the arbor that when the impaling action takes place, the wedge-head 143ᵃ of the plunger 143 is in position to yieldingly hold the upper ends of the spool-engaging levers 139 separated, and the spring-arms of the levers 139 will yield to permit the members 139ᵃ to pass through the holes in the inner flanges of the spool during the impaling action. Thereafter, the members 139 frictionally engage the upper flange of the spool, as shown in Fig. 6. To more certainly cause the arbor to rotate with the spool, so that a retarding action can be secured through the medium of the friction device at the lower end of the arbor stem, the upper end of the arbor head 135 is provided with a transverse vertical slot 158 in which is mounted a U-shaped member 159, which comprises vertical spring-arms 159ᵃ and a lower end web 159ᵇ, the member being secured in position by a transverse rivet 160. As shown in Fig. 20, the arms 159ᵃ are provided at their upper ends with small chisel edge projections 159ᶜ which are adapted to engage the wall of the perforation through the inner top flange 101ᵃ of the spool. These members are tapered to conform to the frusto-conical end portion of the upper arbor head, as is also the case with respect to the levers 139.

When the stripping-cam N comes into action to withdraw the arbor from the spool, the first effect is to cause the extremities of the arms 143ᶜ to strike the bearing sleeve 145 and lift the plunger 143, thus raising the expander-head 143ᵃ sufficiently to permit the gripper levers 139 to collapse, so that the arbor can be withdrawn readily through the internal upper flange 101ᵃ of the spool. The purpose is to prevent the gripper projections 139ᵃ from forcing the spool against the bottom of the spool channel during the action of withdrawing the arbor; otherwise, there would be danger of instantaneous stoppage of the spool with consequent breakage of the wire between the spool and the planetary capstan. In the further downward movement of the arbor, the projecting ends of the spring-arms 143ᶜ strike an internal bevel 145ᵃ with which the upper end of the bearing sleeve 145 is provided, so that the arms will be collapsed while the arbor is moving downwardly through the bearing sleeve. After the arms reach a position below the bearing sleeve, the spring 144 forces the plunger 143 downwardly relatively to the arbor, so that the wedge-head 143ᵃ is brought again to the wedging position. The bearing sleeve 145 is further provided at its lower end with an internal bevel surface 145ᵇ which is adapted to engage the projecting end of the arm 143ᶜ and cause a sufficient collapsing action to permit the arms to pass through the bearing sleeve on the up stroke of the arbor with relation to the distributor sleeve P².

Reference has been made to the fact that the spring-catches 128 mounted on the wings 17ᵇ of the cross-head 17 serve to support said cross-head on the collar 130 of the distributor slide P² while the spool is being filled. The lower end of the collar 130 is provided with a bevel 161 which is engaged by the bevel point of a stud 162 mounted on the lower end of the cross-head 17. Thus, while the cross-head 17 reciprocates with the distributing sleeve P², the stop 162 insures the depression of the cross-head 17 in case it should tend to stick in its bearings.

As has been explained, the distributor-cam Q is continuously rotated through the medium of gears connecting it with the main drive shaft B² of the mechanism. As appears from Figs. 1 and 23, the cam Q is provided on its periphery with an external cam projection 163. This cam serves to actuate a rock member 164 constituting a part of the control mechanism R. The member 164 has one arm equipped with a cam roller 164ᵃ adapted to be engaged by the cam projection 163, and it has another arm 164ᵇ which is connected with a link 165 forming part of the mechanism R.

The mechanism R which mainly is mounted on the removable plate 1, further comprises a ratchet wheel 166, having a hub 166ᵃ journalled on the outer end of the stub shaft Q' which is fixedly secured in the plate 1; an oscillating member 167 journalled on the hub 166ᵃ and having an arm 167ᵃ connected by a pivot 168 with the link 165 and with a pawl 169 which co-acts with the ratchet wheel, and having also an arm 167ᵇ which is connected by a spring 170 with the plate 1; a segmental shield 171 carried by an arm 171ᵃ which is adjustably fixed by means of a clamping screw 172 to the outer end of the stationary shaft Q'; a slide 173 having stud and slot connections 174 with the plate 1; a spring 175 tending to retract the slide from the position shown in Fig. 23; a link 176 connected at one end by a pivot 177 with the slide 173 and connected at the other end with said slide by stud and slot connections 178; a spring 179 tending to hold the link 176 depressed; a cam-block 180 secured to the link 176 near its free end, said block having a shoulder 180ᵃ adapted to be engaged by a catch-projection 167ᶜ with which the arm 167ᵃ is provided, and said cam-block being further provided at its lower edge with a cam-projection 180ᵇ; a cam-actuated lever 181 supported centrally on a pivot 182 carried by the plate 1 and extending parallel therewith, said lever 181 being equipped at its upper end with a cam roller 181ᵃ adapted to engage the lower edge of the cam-block 180, said lever 181 being further equipped at its lower end with a cam stud 181ᵇ which co-acts with a lateral cam stud 183 mounted on the adjacent side of the ratchet wheel 166; a rock shaft 184 journalled in the plate 1 and extending to the other end of the frame of the mechanism, where it is journalled in a bearing 185 with which the end plate 2 is equipped on its inner side, as will be understood from Figs. 1 and 5, said rock shaft 184 having at one end an actuating arm 184ᵃ connected by a pivot 186 with the slide 173, and having at the other end an arm 184ᵇ, as will be understood from Figs. 1, 3, 4, and 5; a segmental clutch-withdrawing and locking member 187 mounted on a plunger 187ᵃ which is equipped with a lateral stud 187ᵇ which engages a slot 187ᶜ with which the arm 184ᵇ is provided; and a guide or bearing 188 mounted on the end plate 2 and serving as a guide for the plunger 187ᵃ. The bearing is provided with a slot 188ᵃ, permitting movement of the stud 187ᵇ.

The member 187 has a flat edge lying against one end of the cam M, as will be understood from Fig. 5. It has further a sloping edge 187ᵈ which terminates in a knife edge 187ᵉ which is adapted to enter between the end of the cam M and the stud 121 and thus retract the clutch-plunger 119. The sloping surface 187ᵈ is intercepted near the base end of the member 187 by a slot or locking-recess 187ᶠ. When the clutch-plunger 119 is retracted to disconnect the clutch-plunger 119 from the gear wheel D', the stud 121 rides on the inclined surface 187[d] and finally drops into the locking recess 187[f]. In this position, the cam is locked against rotation, and the inner end of the plunger 119 is free from engagement with the gear wheel D'. Through the medium of the shaft C, the stripper-cam N is likewise locked.

The shape of the cam slot 114 of the drum cam M will now be described. When said cam comes to rest, after having moved the spool-shifter forward and back, the cam is in such position that the cam roller 116 engages a circumferential portion 114[a] of the cam slot at a point almost directly above the shaft C, it being understood that the cam M would, at such time, be advanced through an angle of approximately 90° from the position shown in Fig. 4. The rotation of the cam is in the direction shown by the arrow in Fig. 4. When the cam is first thrown into action, the circumferential portion 114[a] of the cam slot moves past the roller 116 without actuating the spool-shifter. This corresponds with the main portion of the period of stripping. The spool-shifter is then moved forward by the portion 114[b] of the cam groove, which may be said to terminate at about the point 114[c]. There is then a moment of dwell of the spool-shifter at the forward end of its traverse while the portion 114[d] of the cam slot engages the cam roller. The spool-shifter then starts rearwardly with a slow movement which corresponds with the portion 114[e] of the cam slot. During this slow initial return movement, the first few windings of the wire on the freshly introduced spool are made, and the wire is then released from the wire-catcher. The slide is then returned to the starting position by the action of the remaining portion 114[f] of the cam.

The spool-magazine S is shown as comprising a vertically disposed skeleton cylinder, wherein the spools are supported in stacked relation. The lowermost spool rests in the bottom of the spool guide when the spool-shifter is in the retracted position. When the spool-shifter moves forward, it carries with it the spool which is located in the spool chamber 72 of the shifter, while the lowermost spool of the magazine is supported on the wall 71 of the spool-shifter. After the shifting and ejecting actions occur, the shifter is returned to its normally retracted position and the lowermost spool in the magazine drops into the chamber 72 of the shifter.

The operation may be briefly summarized as follows:

The spool-shifter, while in its normally standing retracted position, houses an empty spool received from the magazine. The spool may be shifted to a position beneath the rotary head F by tripping the arm 181 and allowing the slide 173 to be actuated, thus turning the rock shaft 184, and withdrawing the member 187 from the position shown in Figs. 3 and 5. Withdrawal of the member 187 disengages the stud 121 of the plunger 119, and permits the plunger 119 to lock the cam-shaft M to the gear wheel D'. The cams M and N then rotate together, the cam N withdrawing the arbor in time to permit the spool to move to the loading position. The cams make one revolution, and then are locked in the stationary position in the manner described above.

The planetary capstan G, and the associated rotary head F, which serves as an arm for carrying the capstan in its planetary path and serves also as a guide for the wire discharged from the capstan and formed into convolutions by the carrying action of the capstan, move continuously, the capstan G being positively rotated on its own axis while it is carried through the orbit. When the cam roller 123 is freed from the stripping-cam N, the coil-spring 147 quickly elevates the arbor and causes the spool to be impaled thereon. While this action occurs, the lower flange of the spool is held against the bottom of the spool channel by means of the gripper-blocks 104. After the impaling action occurs, the inner lower flange 102[a] of the spool rests on a seat 189 with which the arbor head is provided; and from this time on, the spool is carried upward with the distributor-slide, thus freeing the external lower flange 102 from the gripper-blocks 104. The regular distributing action occurs until the spool has been filled. The capstan G draws unto itself and pays out at each revolution, slightly less wire than is required to encircle the core of the spool, so that there will be a tendency of the wire to grip and wind closely on the spool. At the moment of starting the windings on the spool, the end of the wire is held, it being understood that the spool is practically at a standstill, or has only a slight rotation during the application of the first layer of windings. Bearing in mind that the capstan G moves in an orbit, in the direction indicated by the arrow in Fig. 14, and that the wire is payed from the capstan through the guide member 51 and passes from that member into the annular guide channel 34 of the rotary head and thence to the spool, it will be understood that the wire payed from the capstan trails behind the capstan and passes to the spool. As the diameter of the core increases, due to the successive layers of wire thereon, the spool is turned on its axis to compensate for the diameter of the core. The arbor is so gripped to the spool that the arbor turns with the spool, and the retarding friction upon the lower end of the arbor regulates the tightness of the winding on the spool.

The amount of wire to be wound on a spool may be regulated by adjustment of the segmental guard 171, that is by adjusting the angular position of the arm 171ª on the stationary shaft Q', so that the pawl 169 will ride idly on the segmental guard a greater or less distance, depending upon the adjustment. In this manner, the amount of rotation of the ratchet wheel 166 will depend upon the effective movement of the pawl, that is that portion of the movement when the pawl is in engagement with the ratchet wheel. Since the cam wheel Q makes one rotation corresponding with each complete reciprocation of the distributor slide P², it will be evident that in the construction illustrated, provision has been made for putting a large number of layers of windings on a spool, but provision has also been made for varying the number of such layers. When the spool has been loaded, the cam stud 183 of the ratchet wheel actuates the lever 181, and permits the link 176 to drop, thus bringing the cam-block 180 into the path of the catch-projection 167ᶜ of the oscillating arm 167ª, so that when a cam-projection 163 actuates the rock member 164, the slide 173 will be moved to the position shown in Fig. 23, thus actuating the rock shaft 184 and releasing the clutch-plunger 119 of the drum cam M. Then there follows the withdrawal of the arbor from the loaded spool and the reciprocation of the spool-shifter. During the forward movement of the spool-shifter, the wire-catching, holding and severing device, L, is actuated. In this action, the hook 79 is elevated to a position within the inner shell 33 of the rotary head, so that the wire being payed downwardly from the rotary head while being carried in an annular path, will be engaged by the hook. The hook will then descend and cause the wire to be clamped against the clamping bar 80. An instant later, the wire will be severed by the shear 81. Before the hook again crosses the path of the lip 33ª, it will be lowered to a position shown in Fig. 8. The end of the wire leading from the capstan will remain gripped during the initial portion of the return movement of the spool-shifter and while the initial windings on the freshly introduced spool are being made. The hook will then rise sufficiently to release the wire, and will then drop again to the lower position, while the spool-shifter continues its return movement.

The operations of the arbor and the distributing mechanism have already been fully described. It may be added that when the loaded spool is ejected, it is confined against jumping or tipping action by the flanges 68ᵇ and 69ᵇ on the forward extensions of the sidewalls of the spool-shifter slide.

From the description given, it will be understood that while relatively small convolutions are formed on the capstan G, in the action of drawing the wire onto the capstan, the wire payed out from the capstan and fed into the annular channel 34 of the rotating head F is at first discharged as a relatively large convolution. Otherwise expressed, the wire is payed over the annular lip 33ª which is of larger diameter than the flanges of the spool. This facilitates the entering of the fresh spool within the zone of winding. The amount of wire drawn and delivered by the capstan is, of course, measured by the diameter of the capstan and the rate of rotation of the capstan on its own axis. In the illustration given, the capstan rotates once on its own axis during one movement about its orbit, and thus the amount of wire delivered by the capstan at each movement about its orbit corresponds with the circumference of the capstan. It is possible, however, to change the gear ratio, so that the capstan G will have any desired number of rotations on its own axis during its movement once about the path of its orbit. It will be understood, therefore, that were the capstan G to be rotated twice on its own axis during its orbital movement, it would deliver a length of wire substantially equal to twice the circumstance of the capstan. The effect of increasing the number of revolutions of the capstan G during the orbital movement thereof would be to enlarge the convolutions formed by carrying the wire about the axis of planetary movement, without resorting to the use of means for forming relatively large convolutions of the character shown in the drawings. The means shown, however, enable the wire to be paid from the rotating head on a circle of relatively large diameter for winding upon spools having cores of comparatively small diameter and having flanges of comparatively large diameter. The barrel of the spool may be regarded as a core upon which the wire is wrapped. Were a core of large diameter to be employed, the capstan might be correspondingly enlarged and caused to rotate once on its own axis during each planetary movement; or, the gear ratio adopted might be such as to cause a smaller capstan to rotate more than once on its own axis during each planetary movement.

The improved mechanism may be employed for various purposes. It may, for example, be employed as take-up mechanism for any wire-drawing machine of suitable design; and, if desired, the wire may be drawn through a finishing die interposed between the last capstan of the wire-drawing machine and the planetary capstan. On the other hand, the wire may, if desired, be taken directly from the last capstan of a wire-drawing machine without the interposition of a finishing die. In any event, it is preferred to provide some flexibility between the last capstan of the wire-drawing machine and the planetary capstan. In the illustration given, the spring mounting 25 serves this function. Also, it is preferred to provide some flexibility between the planetary capstan G and the core or spool on which the wire is wound; and, in the illustration given, this flexibility is provided by the yielding segmental guide member 51.

Again, the wire may be drawn from a large spool and rewound on smaller spools, without subjecting the wire to elongating action by means of reducing dies. Thus, it would be possible, for example, to take wire from a large spool, pass it through an annealing furnace, or through a coating bath, and then rewinding it, subdividing it so that the wire would be wound on a plurality of smaller spools.

The improved mechanism may be employed as take-up mechanism for winding any flexible member having a moderate amount of stiffness, comparable, for example, with that of the finest wire, or having much greater stiffness, comparable, for example, with medium or larger sizes of wire.

Various uses for the invention will occur to those skilled in the art. For example, with slight modifications, the improved mechanism may be employed for winding insulated wire on the spools of solenoids. In such case, the initial end of the wire can be allowed to protrude by regulating the point at which the end of the wire is released from the device L on the rearward stroke of the spool-shifter.

Another form of the invention in which a positively driven capstan is employed for drawing wire onto itself and then effecting the winding of the wire as it is discharged upon an independent receiving core is illustrated in my co-pending application, Serial Number 689,651 filed January 31, 1924.

The foregoing detailed description has been given for clearness of understanding only and no unnecessary limitations should be understood therefrom, but the appended claims should be construed as broadly as permissible in view of the prior art and of the premises.

What I regard as new, and desire to secure by Letters Patent, is:

1. In a machine of the character set forth, the combination of a positively driven capstan upon and from which convolutions of a strand form and are discharged progressively, and an independent core so related to said capstan that the discharged strand is progressively wrapped on said core by the discharging action of said capstan.

2. In a machine of the character set forth, a positively driven capstan upon which convolutions of a strand form as the strand is drawn to the capstan, means for causing the convolutions to grip the capstan, and an independent receiving core positioned with respect to the capstan to receive therefrom the discharging strand and upon which the strand is wound by the action of said capstan.

3. In a machine of the character set forth, a planetary capstan upon which convolutions of a strand form as the strand is drawn to the capstan, means for rotating the capstan on its own axis, and an independent receiving core upon which the strand is wound by the action of said capstan.

4. In a machine of the character set forth, a positively driven planetary capstan upon which convolutions of a strand form as the strand is drawn to the capstan, associated gripping means engaging convolutions on said capstan, and an independent receiving core upon which the strand is wound by the action of said capstan.

5. In a machine of the character set forth, a capstan upon which the convolutions of a strand form as the strand is drawn to the capstan, means for causing the convolutions to grip the capstan, and an independently revoluble receiving core upon which the strand is wound by action of said capstan.

6. In a machine of the character set forth, a positively rotated planetary capstan upon which convolutions of a strand form as the strand is drawn to the capstan, and associated means for causing the convolutions to grip the capstan.

7. In means of the character set forth, a rotary head provided with a central passage, a positively rotated planetary capstan eccentrically mounted on said head, means for guiding a flexible strand through said head and to said capstan, and means for guiding and directing the strand as it is discharged from the capstan and forming it in convolutions as it is discharged from said head.

8. In a machine of the character set forth, the combination of a rotary head provided with a central passage at one end and with guiding means for the discharging portion of a strand at the other end, a planetary capstan mounted on said head, and means for guiding a strand from said central passage to said capstan, the discharging portion of the strand passing from said capstan through said first-named guiding means.

9. In a machine of the character set forth, the combination of a rotary head provided at one end with a central passage and provided at the other end with an annular guide-channel which opens at an annular orifice, a planetary capstan carried by said head, means for guiding a strand from said central passage to said capstan, and means for guiding the portion of the strand discharging from said capstan to said annular guide-channel.

10. In a machine of the character set forth, the combination of a rotary head provided at one end with a central passage and provided at the other end with an annular guide-channel which opens at an annular orifice, a planetary capstan carried by said head, means for guiding a strand from said central passage to said capstan, and a segmental guide member carried by said rotary head and interposed between said capstan and said annular guide-channel.

11. In a machine of the character set forth, the combination of a rotary head provided at one end with a central passage and provided at the other end with an annular guide-channel which opens at an annular orifice, a planetary capstan carried by said head, means for guiding a strand from said central passage to said capstan, and a yieldingly held segmental guide-member interposed between said capstan and said annular guide-channel.

12. In a machine of the character set forth, the combination of a rotary head provided at one end with a central passage, a positively driven capstan mounted on said head and disposed near the other end thereof, means for guiding a flexible member from said central passage to said capstan, and a curved guide-member mounted on said head and adapted to receive the flexible member as it is discharged from said capstan.

13. In a machine of the character set forth, the combination of a rotary head provided at one end with a central passage, a positively driven capstan mounted on said head and disposed near the other end thereof, means for guiding a flexible member from said central passage to said capstan, and a yieldingly held curved guide-member mounted on said rotary head and adapted to receive the flexible member as it is discharged from said capstan.

14. In a machine of the character set forth, the combination of a rotary head provided at one end with a central passage, a positively driven capstan mounted on said head and disposed near the other end thereof, means for guiding a flexible member from said central passage to said capstan, and a yieldingly held centrifugally acting guide-member receiving the flexible member as it passes from said capstan.

15. In means of the character set forth, mechanism including a rotating capstan for drawing a flexible member to and winding it on the capstan and discharging said flexible member in the form of a convolute to form coils, a plurality of receiving means for successively receiving coils, and means for automatically effecting shifting of said receiving means.

16. In means of the character set forth, mechanism including a rotating capstan for drawing a flexible member to and winding it on the capstan and discharging said flexible member in the form of a convolute to form coils, a series of receiving cores, and automatically acting means for moving said cores in succession to and away from the loading position.

17. In means of the character set forth, mechanism including a rotating capstan for drawing a flexible member to and winding it on the capstan and discharging said flexible member in the form of a convolute to form coils, a series of receiving cores, automatically acting means for moving said cores in succession to and away from the loading position, and means for varying the period of shifting the cores.

18. In a machine of the character set forth, the combination of a rotary head provided at one end with a central passage and at the opposite end with means for guiding and discharging a flexible member in the form of a relatively large convolute, a planetary capstan mounted on said head and adapted to form relatively small convolutions thereon, said flexible strand passing from said capstan to said guiding and discharging means, and means for guiding a flexible strand through said central passage and to said capstan.

19. In a machine of the character set forth, a rotary head, a planetary capstan carried thereby, means for positively rotating said capstan on its own axis, and an annular discharge lip carried by said head over which the flexible strand may play as it is discharged in convolute form from said mechanism.

20. In a machine of the character set forth, the combination of a rotary head provided at one end with a central passage, a stationary gear co-axial with said head, a capstan mounted on said head and equipped with a gear actuated from said first-named gear, and means for guiding a flexible strand through said central passage and to said capstan.

21. In mechanism of the character set forth, a rotary head equipped at one end with a tubular shaft, a fixed annular gear encircling said shaft, a capstan shaft parallel with said first-named shaft and journalled in said head in an eccentric position, a capstan fixedly mounted on the capstan shaft, a gear on the capstan shaft actuated from said first-named gear, and means for guiding a flexible strand through said first-named shaft and to said capstan.

22. In a machine of the character set forth, a rotary head equipped with a tubular shaft, a bearing supporting said head through the medium of said shaft, means for rotating said head, said head having its other end equipped with an annular passage provided with an annular orifice, a capstan shaft journalled in said head in an eccentric position and extending parallel with said first-named shaft, a capstan secured on said capstan shaft, a gear secured on said capstan shaft, an annular stationary externally toothed gear encircling said first-named shaft and serving to actuate said second-mentioned gear, and means for guiding a flexible strand through said tubular shaft and to said capstan, said strand passing from said capstan to said annular passage.

23. In a machine of the character set forth, a hollow rotary head equipped at one end with a tubular shaft and at the opposite end with an annular passage the inner wall of which depends below the outer wall and affords an annular lip, an eccentrically mounted capstan carried by said head, means for rotating said capstan on its own axis during its planetary movement, and means for guiding a flexible strand through said tubular shaft and to said capstan, said strand passing from the capstan to said annular passage.

24. In mechanism of the character set forth, a positively driven capstan, a guard encircling said capstan and separated therefrom by a small space, and spring-held presser rollers mounted on said guard and adapted to engage convolutions on said capstan.

25. In combination, a rotary head, a positively driven eccentrically positioned capstan mounted on said head, and a gripper device associated with said capstan and detachably connected with said head.

26. In combination, a positively driven capstan, an associated annular guard provided with recesses, spring-held presser rolls mounted on said guard and projecting through said recesses and adapted to engage convolutions on said capstan, and means for supporting said guard.

27. In combination, a rotary head, an eccentrically positioned capstan mounted on said head, gripping means associated with said capstan, and means for deflecting away from the capstan the strand issuing therefrom and directing said strand through a curve substantially concentric with the axis of said head.

28. In mechanism of the character set forth, a rotary head equipped with an annular discharge lip, a capstan eccentrically mounted on said head, a gripper device associated with said capstan, and means for deflecting a strand away from said capstan and directing it to a position from which it can be discharged over said annular lip.

29. In means of the character set forth, mechanism for forming convolutions and discharging them in a coil, means for receiving a coil as it is formed, and means for automatically effecting relative movement periodically between said mechanism and said means.

30. In combination, mechanism for forming convolutions and discharging them in a coil, and automatic periodically acting mechanism serving to place cores in position to receive coils and effect shifting of the cores when filled.

31. In combination, mechanism including a positively rotated capstan for forming convolutions while exerting a pulling action upon the flexible member and progressively discharging convolutions to form a coil, a plurality of means for receiving coils, and means for effecting relative movement between said mechanism and the coil receiving means.

32. In combination, mechanism for forming convolutions and discharging them in a coil, and spool positioning and ejecting mechanism associated with said first-named mechanism.

33. In combination, mechanism for forming convolutions and discharging them in a coil, means for removing a loaded spool and positioning a fresh spool, and means for causing relative movement between the spool and the convolution-forming mechanism to effect distribution on the spool.

34. In combination, mechanism for forming convolutions and discharging them in a coil, and spool positioning and ejecting mechanism associated with said first-named mechanism, said second-named mechanism including means for effecting axial reciprocation of the spool while it is receiving the coil.

35. In combination, convolution-forming and discharging mechanism, spool-feeding and ejecting mechanism, and a distributing device for effecting distribution of the convolutions on the spool.

36. In combination, convolution-forming and discharging mechanism, spool-feeding and ejecting mechanism, and a spool-reciprocating device for effecting distribution.

37. In combination, convolution-forming and distributing mechanism, spool-feeding and ejecting mechanism, a spool-impaling and recoprieating device, and means for effecting disengagement of the impaling means from the spool.

38. In combination, convolution-forming and discharging mechanism, spool-feeding and ejecting mechanism, a spool-reciprocating device for effecting distribution, a spool-impaling device working therethrough, and means for withdrawing the impaling device.

39. In combination, convolution-forming and discharging mechanism, spool-feeding and ejecting mechanism, a tubular spool-reciprocating device, means for actuating the spool-reciprocating device to effect distribution, an arbor for impaling the spool, and periodically actuated means for projecting and retracting the arbor.

40. In combination, convolution-forming and discharging mechanism, spool-feeding and ejecting mechanism, spool-reciprocating mechanism for effecting distribution, and periodically actuated means for effecting release of the spool, said means being provided with means whereby the number of convolutions formed on a spool may be varied.

41. In combination, convolution-forming and discharging mechanism, spool-feeding and ejecting mechanism, and spool-supporting and reciprocating device for effecting distribution, the construction permitting rotative slippage of the spool.

42. In combination, convolution-forming and discharging mechanism, spool-feeding and ejecting mechanism, a tubular spool-reciprocating device, an arbor for impaling the spool, the construction permitting rotative slippage of the spool, and periodically actuated means for projecting and retracting the arbor.

43. In combination, convolution-forming and discharging mechanism, a core for receiving the discharged convolutions, means for effecting relative movement between the convolution-forming mechanism and the core periodically, and frictional means for holding the core adapted to permit rotative movement of the core under stress exerted by the strand being payed out by the convolution-forming and discharging mechanism.

44. In combination, convolution-forming and discharging mechanism, spool-introducing and discharging mechanism, and a strand severing device.

45. In combination, convolution-forming and discharging mechanism, and spool-introducing and discharging mechanism provided with an associated spool magazine.

46. In combination, convolution-forming and discharging mechanism, spool-introducing and discharging mechanism, and means for supporting and reciprocating the spool to effect distribution of the strand.

47. In combination, convolution-forming and discharging mechanism, a reciprocating slide provided with means for receiving a fresh spool and means for ejecting a loaded spool, and means for effecting axial reciprocation of the spool being loaded.

48. In combination, convolution-forming and discharging mechanism, spool-holding and reciprocating means associated therewith for effecting distribution, a slide provided with means adapted to introduce a fresh spool and provided with means adapted to eject the loaded spool, and means for periodically actuating said slide, said last-named means having associated therewith means for varying the period of actuation of the slide.

49. In combination, convolution-forming and discharging mechanism, spool-introducing and ejecting mechanism, means for actuating the spool-introducing and ejecting mechanism, a spool-impaling and reciprocating device, means for actuating the spool-supporting and reciprocating device, and a governing device controlling the period of actuation of the spool-introducing and ejecting mechanism and the period of actuation of the impaling device.

50. In combination, convolution-forming and discharging mechanism, including a planetary winding drum and associated gripping means, cores for receiving the deposited convolutions, and means for effecting relative movement between said cores and the convolution-forming and discharging mechanism.

51. In combination, convolution-forming and discharging mechanism, including a winding drum and associated gripping means, a chute extending beneath said drum, a periodically actuated spool-introducing slide moving in said chute, and a spool magazine associated with said slide.

52. In combination, convolution-forming and discharging mechanism, spool-introducing and discharging mechanism, and means for catching and holding the strand during the spool-shifting operation.

53. In combination, convolution-forming and discharging mechanism, spool-introducing and discharging mechanism, and means for catching and holding the strand and effecting severing thereof.

54. In combination, a rotary head, a planetary capstan carried thereby, means for deflecting a strand from said capstan and effecting discharge thereof in convolute form from said head, spool-introducing and discharging mechanism, and a strand-catching device adapted to rise above the plane of discharge from said head, catch the strand as it is carried about by said capstan and lower the strand.

55. In combination, convolution-forming and discharging mechanism, spool-introducing and discharging mechanism, and a strand-catching and holding device carried by said last-named mechanism.

56. In combination, convolution-forming and discharging mechanism, a reciprocating spool-shifter provided with means for receiving a fresh spool and means for ejecting a loaded spool, and a strand-catching and holding device mounted on said shifter.

57. In combination, convolution-forming and discharging mechanism, a reciprocating spool-shifter provided with means for receiving a fresh spool and means for ejecting a loaded spool, a strand-catching and holding device mounted on said shifter, and means for actuating said last-mentioned means while it is being carried across the convolution-forming zone.

58. In combination, convolution-forming and discharging mechanism, a reciprocating spool-shifter provided with means for receiving a fresh spool and means for ejecting a loaded spool, and a strand-catcher mounted on said shifter at a point intermediate between the positions of the spools.

59. In combination, convolution-forming and discharging mechanism, a reciprocating spool-shifter provided with means for receiving a fresh spool and means for ejecting a loaded spool, a strand-catcher mounted on said shifter at a point intermediate between the positions of the spools, and means for effecting axial reciprocation of the spool being loaded.

60. In combination, convolution-forming and discharging mechanism, spool-introducing and discharging mechanism, and a strand-catcher and clamping device operative to engage and hold the strand back of the loaded spool.

61. In combination, convolution-forming and discharging mechanism, spool-introducing and discharging mechanism, a hook adapted to catch the strand back of the loaded spool, a clamp associated with said hook, and a severing device associated with said hook and clamp.

62. In combination, convolution-forming and discharging mechanism, a reciprocating slide provided with means for receiving a fresh spool and means for ejecting a loaded spool, a strand-catching, clamping and severing device mounted on said slide, and associated means for actuating said last-named device during actuation of said slide.

63. In combination, convolution-forming and discharging mechanism, a reciprocating spool-shifter provided with means for receiving a fresh spool and means for ejecting a loaded spool, means carried by said shifter for gripping the lower flange of the fresh spool, an arbor adapted to enter the spool, and a distributor slide adapted to reciprocate said arbor while the spool is being filled.

64. In combination, convolution-forming and discharging mechanism, spool-introducing and discharging mechanism, a continuously actuated distributor slide, an arbor carried by said distributor slide and depressibly mounted thereon, and a device adapted to quickly retract the arbor when the shifting of the spool is to be effected.

65. In combination, convolution-forming and discharging mechanism, spool-introducing and discharging mechanism, a reciprocating tubular distributor slide, an arbor working therethrough, means for quickly retracting the arbor when the shifting of the spools is to occur, and spool-gripping means mounted on said arbor.

66. In combination, convolution-forming and discharging mechanism, spool-introducing and discharging mechanism, a reciprocating tubular distributor slide, an arbor working therethrough, means for quickly retracting the arbor when the shifting of the spools is to occur, spool-gripping means mounted on said arbor, and means for frictionally holding said arbor while permitting rotation thereof.

67. In combination, a convolution-forming and discharging mechanism, a spool-shifter, a cam-actuated tubular distributor slide, an arbor working therethrough, a spring mounted in the distributor slide which is adapted to project the arbor, and a stripper-cam and associated means for retracting the arbor when the spool-shifting action occurs.

68. In combination, convolution-forming and discharging mechanism, a spool-shifter, a cam-actuated tubular distributor slide, an arbor working therethrough, a spring mounted in the distributor slide which is adapted to project the arbor, a cross-head releasably connected with said distributor slide and connected with the arbor stem, and a cam adapted to depress said cross-head when shifting of spools is to occur.

69. In combination, convolution-forming and discharging mechanism adapted to maintain uniform tension on a strand being drawn thereto, spool-feeding and ejecting mechanism, and a distributing device for effecting distribution of convolutions on the spool.

70. In combination, a positively driven capstan and associated means for gripping convolutions thereon to maintain a uniform tension upon the strand being drawn by the capstan, and means associated with said capstan for guiding the strand and discharging it therefrom whereby the strand will be delivered from the mechanism in convolutions to form a coil.

71. In combination, a positively rotated capstan having a planetary movement, a core upon which the strand is wound as it is payed out from the capstan, and a yielding guiding member for the strand interposed between the capstan and the core.

72. In combination, a positively rotated capstan having a planetary movement, a core upon which the strand is wound as it is payed out from the capstan, a source from which the strand is drawn to the capstan, and a yielding guide interposed between said capstan and said source.

73. In combination, a positively rotated capstan having a planetary movement, a core to which a strand is payed from said capstan, a source of supply from which the strand is drawn to the capstan, a yielding guide interposed between the capstan and the source of supply, and a yielding guide between said capstan and said cone.

74. In combination, a positively rotated capstan, means for carrying said capstan through an annular path, a gripping device associated with the capstan, a source from which a strand is drawn to the capstan, and a yielding guide interposed between the capstan and the source of supply.

75. In combination, convolution-forming and discharging mechanism, a spool-shifter guide, a spool-shifter moving therein, spool-grippers movably mounted on said shifter. and stationary cams associated with said guide and adapted to actuate said grippers.

76. In means of the character set forth, a reciprocating distributor slide, an arbor depressibly mounted on said slide, means for retracting the arbor to effect stripping, and spool-grippers mounted on said arbor.

77. In means of the character set forth, a reciprocating distributor slide, an arbor depressibly mounted on said slide, means for retracting the arbor to effect stripping, spool-grippers mounted on said arbor, and means for relieving the gripping action of said grippers in the retracting stroke of the arbor.

78. In means of the character set forth, a reciprocating distributor slide, an arbor depressibly mounted on said slide, means for retracting the arbor to effect stripping, spool-grippers mounted on said arbor, and means for relieving the gripping action of said grippers during the initial portion of the withdrawing stroke of the arbor.

79. In means of the character set forth, a reciprocating distributor slide, an arbor depressibly mounted on said slide and partaking of the movements thereof during the loading of the spool, a spool impaled by said arbor, said spool and arbor having co-acting means for causing the arbor to rotate with the spool when the latter is actuated by the drawing action of a strand, independent means for depressing the arbor to effect a stripping action, and an adjustable friction connection between said arbor and said last-named means.

80. In combination, a rotary head having at one end a chamber within which a spool may reciprocate while being loaded and having at the other end a passage for admitting a strand, means for rotating said head, a capstan having a shaft journalled eccentrically on said head, said capstan being disposed adjacent the lower portion of said chamber, means for rotating said capstan on its own axis during its planetary movement, a spool, and means for reciprocating said spool within said chamber while said spool is having wound thereon a strand payed from said capstan.

81. In combination, a rotary head having at one end a chamber within which a spool may reciprocate while being loaded and having at the other end a passage for admitting a strand, means for rotating said head, a capstan having a shaft journalled eccentrically on said head, said capstan being disposed adjacent the lower portion of said chamber, means for rotating said capstan on its own axis during its planetary movement, means for bringing successive spools to a position axial with respect to said head, and means for reciprocating each spool within said chamber while it is having wound thereon a strand payed from said capstan.

82. In mechanism of the character set forth, a hollow rotary head having at one end a central passage for admitting a strand, an eccentrically mounted capstan carried by said head, a guide at the discharge end of said head having an annular channel provided with an annular orifice, said channel having its outer wall provided with a slot, and a curved guide interposed between the capstan and slot through which a strand may pass from the capstan to said annular passage.

83. In mechanism of the character set forth, a hollow rotary head having at one end a central passage for admitting a strand, an eccentrically mounted capstan carried by said head, a guide at the discharge end of said head having an annular channel provided with an annular orifice, said channel having its outer wall provided with a slot, and a pivotally mounted curved guide interposed between the capstan and slot through which a strand may pass from the capstan to said annular passage.

84. In combination, convolution-forming and discharging mechanism, and a reciprocating spool-shifter provided with means for receiving a fresh spool and means for ejecting a loaded spool, said spool-shifter having an extension provided with flanges adapted to overlie the flanges of the loaded spool during the discharging operation.

85. In combination, convolution-forming and discharging mechanism, a reciprocable spool-shifter provided with means for receiving a fresh spool and means for ejecting a loaded spool, a strand-catching and holding device mounted on said shifter, means for imparting reciprocations to said shifter, said means being constructed and arranged to give to the spool-shifter a relatively slow initial return movement, a reciprocating distributor slide, an arbor depressibly mounted thereon, a spool impaled by said arbor, and means for effecting stripping action, said strand-catching and holding device being adapted to hold the strand while the initial wrappings on the fresh spool are being made.

86. In combination, convolution-forming and discharging mechanism, a reciprocable spool-shifter provided with means for receiving a fresh spool and means for ejecting a loaded spool, a strand-catching and holding device mounted on said shifter, means for imparting reciprocations to said shifter, said means being constructed and arranged to give to the spool-shifter a relatively slow initial return movement, a reciprocating distributor slide, an arbor depressibly mounted thereon, a spool impaled by said arbor, means for effecting stripping action, said strand-catching and holding device being adapted to hold the strand while the initial wrappings on the fresh spool are being made, a cam carried by said strand-catching and holding device, and a co-acting cam mounted on a stationary support and disposed adjacent the path of the said first-named cam.

87. In combination, convolution-forming and discharging mechanism, a reciprocable spool-shifter provided with means for receiving a fresh spool and means for ejecting a loaded spool, a cam for actuating said spool-shifter, gear mechanism adapted to actuate said cam periodically, and means for clutching said cam to said gear mechanism, said gear mechanism being equipped with shock-absorbing means.

88. In combination, convolution-forming and discharging means, a reciprocable spool-shifter provided with means for receiving a fresh spool and means for ejecting a loaded spool, a reciprocating distributor slide, an arbor depressibly mounted on said slide, a shaft, a spool-shifter cam secured on said shaft, a stripper-cam secured on said shaft, constantly rotating gear mechanism adapted to actuate said shaft periodically, said gear mechanism being equipped with shock-absorbing means, and control mechanism adapted to periodically clutch the shaft and its cams to said gear mechanism.

89. In combination, convolution-forming and discharging means, a reciprocable spool-shifter provided with means for receiving a fresh spool and means for ejecting a loaded spool, a reciprocating distributor slide, an arbor depressibly mounted on said slide, a shaft, a spool-shifter cam secured on said shaft, a stripper-cam secured on said shaft, constantly rotating gear mechanism adapted to actuate said shaft periodically, said gear mechanism being equipped with shock-absorbing means, control mechanism adapted to periodically clutch the shaft and its cams to said gear mechanism, said control mechanism serving also to withdraw the clutch after one rotation of the cams and releasably lock the cams against rotation during their period of inactivity.

90. In combination with a capstan of a wire-drawing machine, take-up mechanism comprising convolution-forming and discharging mechanism geared to have a definite rotation with relation to said capstan, and means for periodically moving cores to and from the loading position with respect to said convolution-forming and discharging mechanism.

91. In combination with a capstan of a wire-drawing machine, take-up mechanism comprising convolution-forming and discharging mechanism geared to have a definite rotation with relation to said capstan, means for periodically moving cores to and from the loading position with respect to said convolution-forming and discharging mechanism, and means for reciprocating each core to effect distribution of the strand as it is wrapped on the core.

92. In mechanism of the character set forth, the combination with a wire-drawing capstan of a wire-drawing machine, of take-up mechanism comprising convolution-forming and discharging mechanism geared to have a definite rate of rotation with respect to said capstan, said mechanism comprising a rotating head and a positively actuated planetary capstan carried thereby, said head having a central passage at one end for admitting the wire drawn to said planetary capstan and having at the other end means for receiving the wire passing thereto from said planetary capstan and causing said wire to be discharged from said head in convolute form.

93. In mechanism of the character set forth, the combination of a wire-drawing capstan of a wire-drawing machine, take-up mechanism comprising convolution-forming and discharging mechanism geared to have a definite rate of rotation with respect to said capstan, said mechanism comprising a rotating head and a positively actuated planetary capstan carried thereby, said head having a central passage at one end for admitting the wire drawn to said planetary capstan and having at the other end means for receiving the wire passing thereto from said planetary capstan and causing said wire to be discharged from said head in convolute form, and a reducing die interposed between said first-named capstan and said second-named capstan.

94. Wire coiling and discharging mechanism comprising annularly moving means which exerts a gripping and consequent pulling action upon the wire, the point of gripping being a continuously changing one and the carrying of the wire in an annular path serving to form convolutions which are progressively discharged from the mechanism.

95. Wire coiling and discharging mechanism comprising a winding member and wire-gripping means having a planetary movement, and means for rotating said winding member about its own axis during its planetary movement.

96. Wire coiling and discharging mechanism comprising a rotary carrier provided at its axial portion with wire-guiding means, a winding member journaled in said carrier and adapted to have the wire extend thereabout from said axial wire-guiding means, means for rotating said winding member upon its own axis during its planetary movement, and wire-gripping means associated with said wire-winding member.

97. Wire coiling and discharging mechanism comprising a supporting member, a carrier comprising a tubular axle and an arm, wire-guiding means for guiding wire through said axle, means for actuating said carrier, a wire-winding member journaled in said arm and equipped with a fixedly secured pinion, a stationary gear coaxial with said tubular axle and meshing with said pinion, and a wire-gripping device associated with said wire-winding member, said wire-winding member and associated wire-gripping device serving to exert a constantly shifting gripping and pulling action upon the wire while the planetary movement forms the wire into continuously discharged convolutions.

98. Wire coiling and discharging mechanism comprising a positively rotated member adapted to receive convolutions as they are formed and progressively discharge the strand from the formed convolutions and form fresh convolutions, and associated wire gripping means adapted to exert a continuously shifting gripping action, whereby fresh convolutions are progressively formed and brought within the gripping zone while the formed convolutions are progressively discharged as a strand from the gripping zone.

FRANK HONIG.